(12) United States Patent
Nakagawa et al.

(10) Patent No.: US 11,582,359 B2
(45) Date of Patent: Feb. 14, 2023

(54) IMAGE READING APPARATUS AND IMAGE FORMING SYSTEM

(71) Applicant: CANON KABUSHIKI KAISHA, Tokyo (JP)

(72) Inventors: Tomohito Nakagawa, Chiba (JP); Teppei Nagata, Chiba (JP); Shogo Terakawa, Chiba (JP); Yukihiro Soeta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/578,869

(22) Filed: Jan. 19, 2022

(65) Prior Publication Data

US 2022/0239795 A1 Jul. 28, 2022

(30) Foreign Application Priority Data

Jan. 26, 2021 (JP) .............................. JP2021-010182

(51) Int. Cl.
*H04N 1/00* (2006.01)
*G03G 15/00* (2006.01)
*H04N 1/04* (2006.01)

(52) U.S. Cl.
CPC ..... *H04N 1/00795* (2013.01); *G03G 15/6529* (2013.01); *H04N 1/00559* (2013.01);
(Continued)

(58) Field of Classification Search
CPC .......... G03G 15/5062; G03G 21/1666; G03G 15/04072; G03G 21/00; G03G 15/04; G03G 15/0856; G03G 15/0862; G03G 2215/0894; G03G 2221/1636; G03G 15/2053; G03G 15/043; G03G 15/0865; G03G 15/04036; G03G 15/04045; G03G 15/0855;
(Continued)

(56) References Cited

U.S. PATENT DOCUMENTS

2006/0050951 A1* 3/2006 Iwasaki ................ H04N 1/1903
382/151
2021/0360116 A1* 11/2021 Nagata ............... G03G 15/5062
(Continued)

FOREIGN PATENT DOCUMENTS

JP  2006109406 A  4/2006

*Primary Examiner* — Negussie Worku
(74) *Attorney, Agent, or Firm* — Rossi, Kimms & McDowell LLP

(57) ABSTRACT

An image reading apparatus including: a conveyance path; a light transmitting member; a first reading unit; a second reading unit; a first roller disposed opposite to the first reading unit; a second roller disposed opposite to the second reading unit; a holding member configured to hold the first roller and the second roller; a plurality of first abutment portions provided on both end portion sides in a width direction of the first roller and forming a gap between the light transmitting member and the first roller by abutting on the light transmitting member; a plurality of second abutment portions provided on both end portion sides in the width direction of the second roller and forming a gap between the light transmitting member and the second roller by abutting on the light transmitting member; and an urging member urges the holding member against the light transmitting member.

13 Claims, 15 Drawing Sheets

(52) U.S. Cl.
CPC ..... *H04N 1/00602* (2013.01); *H04N 1/00612* (2013.01); *H04N 1/00615* (2013.01); *H04N 1/0464* (2013.01)

(58) Field of Classification Search
CPC ........... G03G 15/0435; G03G 15/0889; G03G 15/5054; G03G 15/6529; G03G 21/0005; G03G 21/169; G03G 21/1814; G03G 15/065; G03G 15/326; G03G 15/55; G03G 2221/0005; G03G 13/0133; G03G 15/166; G03G 21/02; G03G 21/1647; G03G 2215/017; G03G 2215/0404; G03G 2215/047; G03G 2215/0897; G03G 2215/2064; G03G 2221/0089; G03G 2221/1627; G03G 2221/1651; G03G 2221/183; G03G 2221/1884; G03G 15/00; G03G 15/0189; G03G 15/0849; G03G 15/0872; G03G 15/0886; G03G 15/234; G03G 15/5016; G03G 15/502; G03G 15/5029; G03G 15/5041; G03G 15/5058; G03G 15/602; G03G 15/605; G03G 15/6573; G03G 21/007; G03G 21/12; G03G 21/1623; G03G 21/1842; G03G 21/20; G03G 2215/00037; G03G 2215/00109; G03G 2215/00569; G03G 2215/00616; G03G 2215/00738; G03G 2215/0119; G03G 2215/028; G03G 2215/0497; G03G 2215/0607; G03G 15/0126; G03G 15/04081; G03G 15/06; G03G 15/0801; G03G 15/0806; G03G 15/0808; G03G 15/081; G03G 15/0882; G03G 15/0896; G03G 15/1605; G03G 15/161; G03G 15/1615; G03G 15/2042; G03G 15/2057; G03G 15/2064; G03G 15/232; G03G 15/321; G03G 15/5045; G03G 15/505; G03G 15/6552; G03G 15/751; G03G 15/757; G03G 21/0011; G03G 21/0035; G03G 21/0047; G03G 21/08; G03G 21/1619; G03G 21/1633; G03G 21/1652; G03G 21/1803; G03G 21/181; G03G 21/1817; G03G 21/1853; G03G 21/1864; G03G 21/1867; G03G 21/206; G03G 2215/0016; G03G 2215/00987; G03G 2215/0129; G03G 2215/0177; G03G 2215/018; G03G 2215/0402; G03G 2215/0634; G03G 2221/0068; G03G 2221/163; G03G 2221/1654; G03G 2221/1657; G03G 2221/166; G03G 2221/1672; G03G 2221/1678; G03G 2221/1687; G03G 2221/169; G03G 2221/1815; G03G 9/0827; H04N 1/00615; H04N 1/113; H04N 1/00795; H04N 1/00602; H04N 1/00798; H04N 1/00092; H04N 1/00559; H04N 1/0057; H04N 1/00806; H04N 1/00909; H04N 1/00994; H04N 1/00997; H04N 1/02895; H04N 1/0318; H04N 1/032; H04N 1/1135; H04N 2201/02414; H04N 2201/02416; H04N 2201/02431; H04N 1/00323; H04N 1/00557; H04N 1/00612; H04N 1/0981; H04N 1/028; H04N 1/0282; H04N 1/04; H04N 1/0464; H04N 1/40; H04N 1/401; H04N 1/60; H04N 1/00015; H04N 1/00034; H04N 1/00037; H04N 1/00082; H04N 1/00567; H04N 1/02835; H04N 1/0285; H04N 1/0288; H04N 1/03; H04N 1/0306; H04N 1/0312; H04N 1/0315; H04N 1/10; H04N 1/1225; H04N 1/1235; H04N 1/125; H04N 1/1295; H04N 1/19; H04N 1/1937; H04N 1/2323; H04N 1/40025; H04N 1/40087; H04N 1/4097; H04N 1/484; H04N 1/6033; H04N 1/6086; H04N 2201/0094; H04N 2201/03133; H04N 2201/03141; H04N 2201/03145; H04N 2201/03166; H04N 1/00095; H04N 1/00525; H04N 1/00588; H04N 1/00628; H04N 1/00681; H04N 1/00708; H04N 1/00724; H04N 1/00726; H04N 1/00737; H04N 1/02815; H04N 1/0289; H04N 1/029; H04N 1/0313; H04N 1/0316; H04N 1/0635; H04N 1/0657; H04N 1/0685; H04N 1/1017; H04N 1/16; H04N 1/1912; H04N 1/193; H04N 1/40056; H04N 1/4076; H04N 2201/03112; H04N 2201/03125; H04N 2201/03137; H04N 2201/03175; H04N 2201/03179; H04N 7/18; B65H 2801/06; B65H 2301/4454; B65H 2402/54; B65H 2404/1521; B65H 2511/24; B65H 2511/512; B65H 2513/50; B65H 2801/39; B65H 5/06; B65H 5/068; B65H 5/26; B65H 5/38; B65H 7/08; B65H 7/14; B65H 7/20; B65H 2301/51212; B65H 2402/441; B65H 2402/45; B65H 2404/513; B65H 2404/52; B65H 2601/321; B65H 3/46; B65H 3/5223; B65H 3/56; B65H 3/66; B65H 5/062
USPC ....................................................... 358/296
See application file for complete search history.

(56) References Cited

U.S. PATENT DOCUMENTS

| | | | | |
|---|---|---|---|---|
| 2021/0368052 A1* | 11/2021 | Nagata | ............... | G03G 15/6529 |
| 2021/0377415 A1* | 12/2021 | Hasegawa | .......... | H04N 1/00795 |
| 2022/0236680 A1* | 7/2022 | Soeta | ................. | G03G 15/0806 |
| 2022/0239795 A1* | 7/2022 | Nakagawa | ......... | H04N 1/00795 |

* cited by examiner

FIG. 15

| SHEET TYPE | LENGTH OF SUB-SCANNING DIRECTION [mm] | LENGTH OF MAIN SCANNING DIRECTION [mm] | BASIS WEIGHT [g/m2] | SURFACE PROPERTY | COLOR | PRE-PRINTED SHEET | FIRST GEOMETRIC ADJUSTMENT VALUE (FOR FRONT SIDE) | SECOND GEOMETRIC ADJUSTMENT VALUE (FOR BACK SIDE) | READ GAP AMOUNT |
|---|---|---|---|---|---|---|---|---|---|
| ABC PAPER RECYCLING 1 | 210 | 297 | 75 | PLAIN PAPER | WHITE | NO | LEAD POS.: 0.3mm<br>SIDE POS.: 0.1mm<br>MAIN-SCAN MAG.: +0.02%<br>SUB-SCAN MAG.: +0.01% | LEAD POS.: 0.2mm<br>SIDE POS.: 0.1mm<br>MAIN-SCAN MAG.: +0.02%<br>SUB-SCAN MAG.: -0.03% | G(1) |
| ABC PAPER RECYCLING 2 | 297 | 420 | 75 | PLAIN PAPER | WHITE | NO | LEAD POS.: 0.0mm<br>SIDE POS.: -0.0mm<br>MAIN-SCAN MAG.: +0.00%<br>SUB-SCAN MAG.: +0.00% | LEAD POS.: 0.0mm<br>SIDE POS.: -0.0mm<br>MAIN-SCAN MAG.: +0.00%<br>SUB-SCAN MAG.: +0.00% | G(1) |
| DEF PAPER EMBOSS A-1 | 216 | 279 | 150 | EMBOSS | WHITE | NO | LEAD POS.: 0.5mm<br>SIDE POS.: -0.5mm<br>MAIN-SCAN MAG.: +0.02%<br>SUB-SCAN MAG.: +0.02% | LEAD POS.: -0.3mm<br>SIDE POS.: 0.5mm<br>MAIN-SCAN MAG.: +0.01%<br>SUB-SCAN MAG.: -0.03% | G(3) |
| DEF PAPER COAT PAPER P-1 | 279 | 432 | 128 | BOTH SIDE COAT PAPER | WHITE | NO | LEAD POS.: 0.4mm<br>SIDE POS.: -0.2mm<br>MAIN-SCAN MAG.: +0.12%<br>SUB-SCAN MAG.: +0.08% | LEAD POS.: -0.2mm<br>SIDE POS.: 0.6mm<br>MAIN-SCAN MAG.: -0.02%<br>SUB-SCAN MAG.: -0.01% | G(2) |
| XYZ PAPER COLOR 81 | 210 | 297 | 75 | PLAIN PAPER | ORANGE | NO | LEAD POS.: 0.0mm<br>SIDE POS.: -0.0mm<br>MAIN-SCAN MAG.: +0.00%<br>SUB-SCAN MAG.: +0.00% | LEAD POS.: 0.0mm<br>SIDE POS.: -0.0mm<br>MAIN-SCAN MAG.: +0.00%<br>SUB-SCAN MAG.: +0.00% | G(1) |
| XYZ PAPER COLOR 82 | 210 | 297 | 75 | PLAIN PAPER | PINK | NO | LEAD POS.: 0.0mm<br>SIDE POS.: -0.0mm<br>MAIN-SCAN MAG.: +0.00%<br>SUB-SCAN MAG.: +0.00% | LEAD POS.: 0.0mm<br>SIDE POS.: -0.0mm<br>MAIN-SCAN MAG.: +0.00%<br>SUB-SCAN MAG.: +0.00% | G(1) |
| FGH PAPER GRAPH PAPER 75 | 210 | 297 | 75 | PLAIN PAPER | WHITE | YES | LEAD POS.: 0.0mm<br>SIDE POS.: -0.0mm<br>MAIN-SCAN MAG.: +0.00%<br>SUB-SCAN MAG.: +0.00% | LEAD POS.: 0.0mm<br>SIDE POS.: -0.0mm<br>MAIN-SCAN MAG.: +0.00%<br>SUB-SCAN MAG.: +0.00% | G(1) |
| FGH PAPER PLAIN PAPER 2 | 210 | 297 | 75 | PLAIN PAPER | WHITE | NO | LEAD POS.: -0.03mm<br>SIDE POS.: -0.07mm<br>MAIN-SCAN MAG.: +0.06%<br>SUB-SCAN MAG.: -0.01% | LEAD POS.: 0.0mm<br>SIDE POS.: -0.10mm<br>MAIN-SCAN MAG.: +0.04%<br>SUB-SCAN MAG.: +0.02% | G(1) |

FIG. 16

| SHEET TYPE | LENGTH OF SHEET IN SUB-SCAN DIR [mm] | LENGTH OF SHEET IN MAIN SCAN DIR [mm] | BASIS WEIGHT [g/m2] | SURFACE PROPERTY | COLOR |
|---|---|---|---|---|---|
| ABC PAPER RECYCLING 1 | 210 | 297 | 75 | PLAIN PAPER | WHITE |
| ABC PAPER RECYCLING 2 | 297 | 420 | 75 | PLAIN PAPER | WHITE |
| DEF PAPER EMBOSS A-1 | 216 | 279 | 150 | EMBOSS | WHITE |
| DEF PAPER COAT PAPER P-1 | 279 | 432 | 128 | BOTH SIDE COAT | WHITE |
| XYZ PAPER COLOR 81 | 210 | 297 | 75 | PLAIN PAPER | ORANGE |
| XYZ PAPER COLOR 82 | 210 | 297 | 75 | PLAIN PAPER | PINK |

NEW ADDITION · EDIT · DELETE · PRINT POSITION ADJUSTMENT

SHEET LIBRARY EDITING

IMAGE READING APPARATUS AND IMAGE FORMING SYSTEM

BACKGROUND OF THE INVENTION

Field of the Invention

The present invention relates to an image reading apparatus and an image forming system.

An image forming apparatus configured to form an image on a sheet, which is a cut sheet, provides stability of a printing position with high accuracy by positioning (registration) of the sheet. Since the registration is usually performed using one side of a rectangular sheet as a reference, an accuracy variation for each sheet depends on a cutting accuracy of the sheet. In addition to length, orthogonality and parallelism can be cited as the cutting accuracy of the sheet. A difference in the cutting lots of sheets and a surrounding environment greatly influence an accuracy of the registration. Therefore, an accuracy of a front/back registration of the sheet depends on a shape of the sheet as well as a reproducibility of a color. Therefore, in order to provide a front/back printing accuracy equivalent to that in the offset printing in a cut sheet printing machine, it is necessary to adjust a front/back misalignment (front/back registration) by adjusting the printing position, magnification, and distortion every time a cutting lot of sheets or a setting environment is changed.

For the image forming apparatus configured to form images on various sheets, the front/back registration requires particularly an adjustment time among items to be adjusted depending on a material of the sheet. This is because a plurality of sheets needs to be measured and averaged in order to average the variations in sheets in order for a front/back registration portion to perform the front/back registration with high accuracy. There is a demand for the image forming apparatus capable of continuously performing the front/back registration from image forming to sheet discharge and automatically performing adjustment according to a type of sheet in order to shorten the adjustment time of the front/back registration.

For example, an image reading apparatus is known in which an image of a sheet is read by an image sensor while the sheet is being conveyed for front/back registration of the sheet. Japanese Patent Application Laid-Open No. 2006-109406 discloses an image forming apparatus provided with an image reading apparatus configured to read an image of a sheet while conveying the sheet by using a plurality of image sensors arranged in a staggered manner to widen a readable width in a main scanning direction.

When reading the image of the sheet, it is important that a gap in a sheet conveyance path at the reading position is uniform. However, since a plurality of reading units are provided, an area of a light transmitting member is large, and it is difficult to ensure a planarity of the light transmitting member. In a case in which the light transmitting member is not planar, the gap in the sheet conveyance path at the reading position becomes uneven. For example, in a case in which the gap is too large, a fluttering of the sheet to be conveyed increases and a resolution of the image to be read decreases. In a case in which the gap is too small, the image of the sheet to be conveyed may be damaged.

SUMMARY OF THE INVENTION

Therefore, the invention provides an image reading apparatus and an image forming system that can guarantee a gap in a sheet conveyance path at a reading position.

An image reading apparatus according to an embodiment of the present invention comprises: a conveyance path through which a sheet is conveyed in a conveyance direction; a light transmitting member arranged to form a part of the conveyance path; a first reading unit configured to read through the light transmitting member an image of a first surface of the sheet conveyed through the conveyance path in the conveyance direction; a second reading unit which is arranged at a position different from the first reading unit with respect to the conveyance direction and configured to read through the light transmitting member the image of the first surface of the sheet together with the first reading unit; a first roller disposed opposite to the first reading unit; a second roller disposed opposite to the second reading unit; a holding member configured to hold the first roller and the second roller; a plurality of first abutment portions provided on both end portion sides of the first roller with respect to a width direction orthogonal to the conveyance direction and configured to form a gap between the light transmitting member and the first roller by abutting on the light transmitting member; a plurality of second abutment portions provided on both end portion sides of the second roller with respect to the width direction and configured to form a gap between the light transmitting member and the second roller by abutting on the light transmitting member; and an urging member configured to urge the holding member against the light transmitting member.

Further features of the present invention will become apparent from the following description of exemplary embodiments with reference to the attached drawings.

BRIEF DESCRIPTION OF THE DRAWINGS

FIG. 15 is a view showing a sheet library.

FIG. 16 is a view showing a sheet library editing screen displayed on an operation portion.

DESCRIPTION OF THE EMBODIMENTS (Image Forming System)

Figure 1:
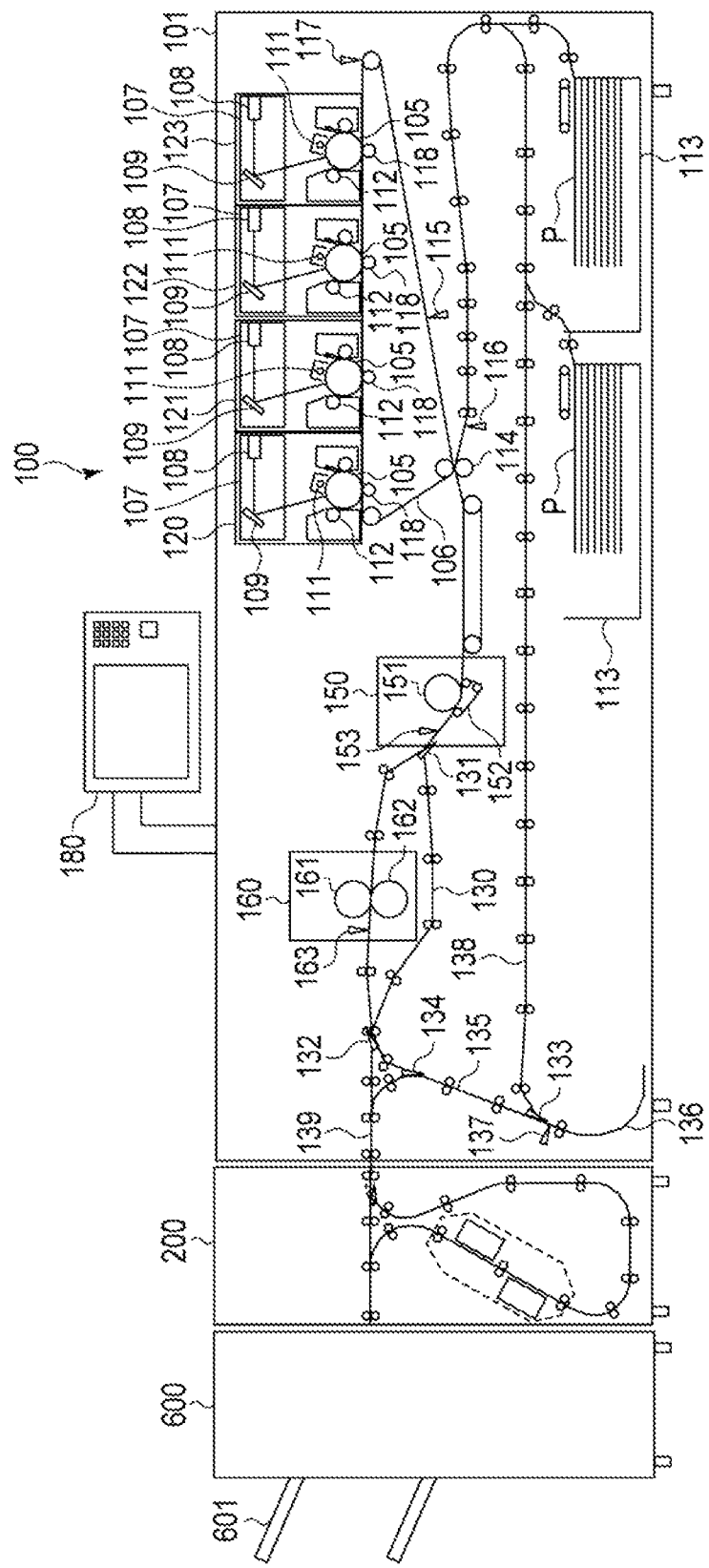
FIG. 1 is a partial cross-sectional view of an image forming system.

FIG. 1 is a partial cross-sectional view of an image forming system 100. The image forming system 100 includes an image forming apparatus 101, an operation portion (user interface) 180, an adjustment unit (automatic adjustment apparatus) 200, and a post-processing apparatus (finisher) 600. The image forming apparatus 101 forms an image on a recording material (hereinafter referred to as a sheet) P. The operation portion 180 is operated by a user to set image forming conditions and displays a state of the image forming apparatus 101. The adjustment unit 200 performs front/back registration for adjusting a positional deviation between the image formed on a front side and the image formed on a back side of the sheet P by the image forming apparatus 101. The post-processing apparatus 600 discharges the sheet P on which the image is formed to the discharge tray 601 and performs post-processing such as staple processing, drilling processing and sorting processing.

(Image Forming Apparatus)

The image forming apparatus 101 is an electrophotographic laser beam printer. The image forming apparatus 101 forms an image on a sheet by using an electrophotographic image forming process. The image forming apparatus 101 includes, for example, an electrophotographic copying machine (for example, a digital copying machine), a color LED printer, an MFP (multifunction peripheral), a facsimile machine, and a printing machine in addition to a laser beam printer. The image forming apparatus 101 is not limited to a color image forming apparatus configured to form a color image, but may be a monochrome image forming apparatus configured to form a monochrome image. The image forming apparatus 101 is not limited to an electrophotographic image forming apparatus, and may be an ink jet printer, a sublimation type printer, or a heat-drying type thermal printer.

Figure 2:
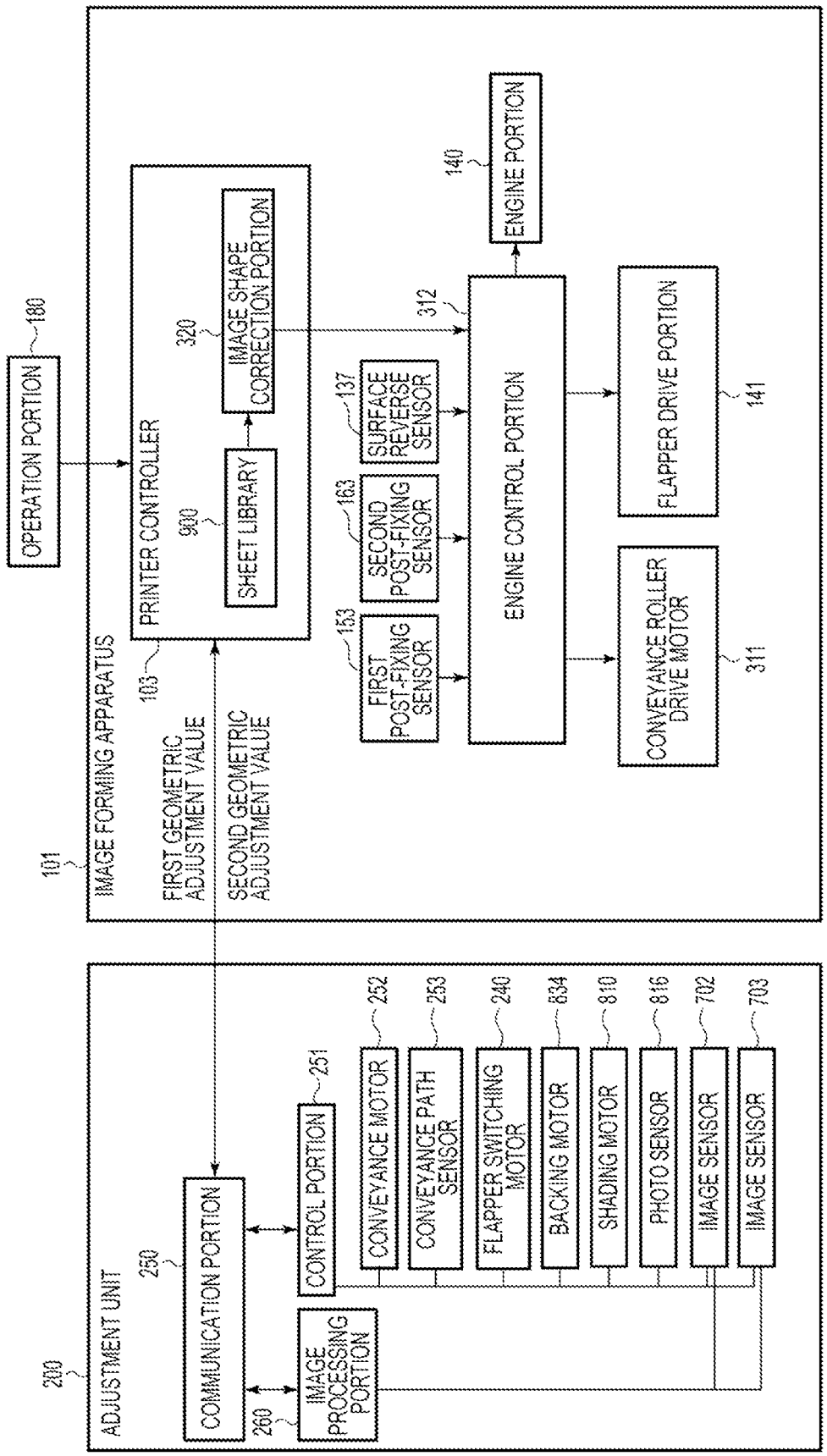
FIG. 2 is a block diagram of an image forming apparatus and an adjustment unit.

The image forming apparatus 101 will be described with reference to FIGS. 1 and 2. FIG. 2 is a block diagram of the image forming apparatus 101 and the adjustment unit 200. The image forming apparatus 101 has a printer controller 103, an engine control portion 312, and an engine portion 140. The printer controller 103 has a sheet library 900 and an image shape correction portion 320. The printer controller 103 is electrically connected to the operation portion 180, the engine control portion 312, and the communication portion 250 of the adjustment unit 200.

The engine control portion 312 is electrically connected to a conveyance roller drive motor 311 and a flapper drive portion 141. The flapper drive portion 141 drives flappers 131, 132, 133 and 134. The engine control portion 312 is further electrically connected to a first post-fixing sensor 153, a second post-fixing sensor 163, a reverse sensor 137, and the engine portion 140. The engine control portion 312 controls the engine portion 140 to execute an image forming process (including sheet feeding process). The engine portion 140 has a yellow image forming portion 120, a magenta image forming portion 121, a cyan image forming portion 122 and a black image forming portion 123. The engine portion 140 further includes a feed cassette 113, an intermediate transfer member 106, a secondary transfer roller 114, a first fixing device 150, and a second fixing device 160.

The yellow image forming portion 120 forms a yellow (Y) toner image. The magenta image forming portion 121 forms a magenta (M) toner image. The cyan image forming portion 122 forms a cyan (C) toner image. The black image forming portion 123 forms a black (K) toner image. Since the yellow image forming portion 120, the magenta image forming portion 121, the cyan image forming portion 122, and the black image forming portion 123 have substantially the same structure except for the color of the toner, the yellow image forming portion 120 will be described below.

The yellow image forming portion 120 has a photosensitive drum 105 which is rotatable. A charger 111, a laser scanner 107, a developing device 112, and a primary transfer roller 118 are disposed around the photosensitive drum 105. The charger 111 uniformly charges the surface of the photosensitive drum 105. The laser scanner 107 has a laser driver (not shown) configured to turn on/off a laser beam emitted from a semiconductor laser 108 according to image data supplied from the printer controller 103. The laser beam emitted from the semiconductor laser 108 is deflected in the main scanning direction by a rotary polygon mirror (not shown). The laser light deflected in the main scanning direction is guided to the surface of the photosensitive drum 105 by a reflecting mirror 109 to expose the uniformly charged surface of the photosensitive drum 105 in the main scanning direction. Thus, an electrostatic latent image is formed on the surface of the photosensitive drum 105 according to the image data.

The developing device 112 develops the electrostatic latent image on the surface of the photosensitive drum 105 with yellow (Y) toner to form the yellow (Y) toner image. A voltage having a polarity opposite to that of the toner image is applied to the primary transfer roller 118 to transfer the yellow (Y) toner image on the surface of the photosensitive drum 105 onto the intermediate transfer member 106. Similarly, the magenta (M) toner image, the cyan (C) toner image and the black (K) toner image formed by the magenta image forming portion 121, the cyan image forming portion 122 and the black image forming portion 123 are sequentially transferred onto the intermediate transfer member 106. The toner images of yellow (Y), magenta (M), cyan (C) and black (K) are superimposed and transferred onto the intermediate transfer member 106 to form a full-color toner image.

The sheets P contained in the feed cassette 113 are conveyed one by one to the secondary transfer roller 114. The secondary transfer roller 114 presses the sheet P against the intermediate transfer member 106 and simultaneously applies a bias having a polarity opposite to that of the toner. The secondary transfer roller 114 transfers the toner image on the intermediate transfer member 106 to the sheet P. The photosensitive drum 105 and the developing device 112 are detachably mounted. In order to determine a feed timing of the sheet P, a feed timing sensor 116 is disposed on a sheet conveyance path in front of the secondary transfer roller 114. Around the intermediate transfer member 106, an image formation start position detection sensor 115 configured to determine a print start position at the time of image formation and a density sensor 117 configured to detect the density of a patch image at the time of density control are arranged. When performing the density control, the density of each patch image is detected by the density sensor 117.

The image forming apparatus 101 has the first fixing device 150 and the second fixing device 160 configured to fix the toner image on the sheet P by heating and pressing the toner image transferred on the sheet P. The first fixing device 150 includes a fixing roller 151 having a heater inside, a pressure belt 152 configured to press the sheet P to the fixing roller 151, and the first post-fixing sensor 153 configured to detect the completion of fixing. The fixing roller 151 and the pressure belt 152 hold the sheet P and heat and pressurize the sheet P to fix the toner image on the sheet P and convey the sheet P. The second fixing device 160 is disposed downstream of the first fixing device 150 in the conveyance direction of the sheet P. The second fixing device 160 is provided to increase the gloss of the image fixed to the sheet P by the first fixing device 150 or to secure the fixing property. The second fixing device 160 includes a fixing roller 161, a pressure roller 162, and the second post-fixing sensor 163.

Depending on the type of the sheet P, it is not necessary to use the second fixing device 160. The flapper 131 switches the conveyance destination of the sheet P to the conveyance path 130. In this case, for the purpose of reducing energy consumption, the sheet P is conveyed to the conveyance path 130 without passing through the second fixing device 160. The flapper 132 switches the conveyance destination of the sheet P between a conveyance path 135 and a discharge path 139. For example, in the face-up discharge mode, the flapper 132 switches the conveyance destination of the sheet P to the discharge path 139 in order to convey the sheet P having the image formed on the first surface to the discharge path 139. For example, in the face-down discharge mode, the flapper 132 switches the conveyance destination of the sheet P to the conveyance path 135 in order to convey the sheet P having the image formed on the first surface to the conveyance path 135. When a trailing edge of the sheet P passes through the flapper 134, the conveyance direction of the sheet P is reversed, and the conveyance destination of the sheet P is switched to the discharge path 139 by the flapper 134.

For example, in the duplex printing mode, the flapper 132 switches the conveyance destination of the sheet P to the conveyance path 135 in order to print an adjustment chart (test pattern for measurement) on the second surface of the sheet P after the adjustment chart is printed on the first surface of the sheet P. The sheet P conveyed to the conveyance path 135 is conveyed to a reverse portion 136. After the trailing edge of the sheet P is detected by the reverse sensor 137, the sheet P conveyed to the reverse portion 136 is reversed in the conveyance direction. The flapper 133 switches the conveyance destination of the sheet P to a conveyance path 138. Thereby, the front side and the back side of the sheet P are reversed. The sheet P is conveyed from the conveyance path 138 to the secondary transfer nip between the intermediate transfer member 106 and the secondary transfer roller 114. The adjustment chart is transferred to the second surface of the sheet by the secondary transfer nip. The sheet P on which the adjustment charts are printed on both surfaces is conveyed from the discharge path 139 to the adjustment unit 200.

(Adjustment Unit)

Figure 3:
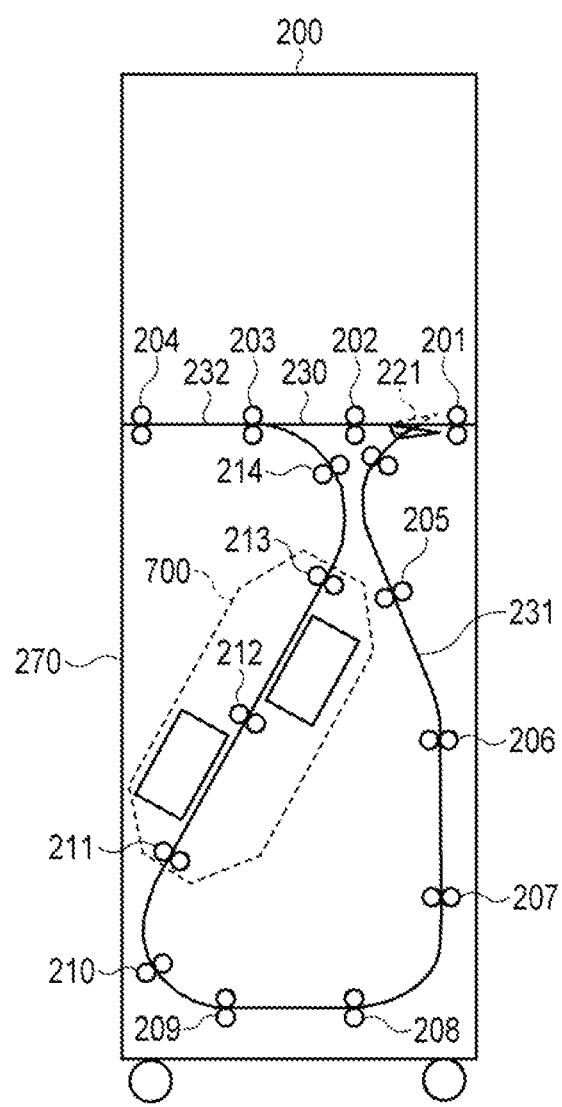
FIG. 3 is a cross-sectional view of the adjustment unit.

The adjustment unit 200 is disposed downstream of the image forming apparatus 101 in the conveyance direction of the sheet P. FIG. 3 is a cross-sectional view of the adjustment unit 200. The adjustment unit 200 includes a through path 230, a measurement path (conveyance path) 231 bypassed to the lower side, and a discharge path 232 configured to discharge a sheet from the through path 230 or the measurement path 231 to the post-processing apparatus 600 arranged downstream of the adjustment unit 200. The measurement path 231 is provided with a front/back registration portion (image reading apparatus) 700 as a measurement portion configured to read the adjustment charts formed on both surfaces of the sheet P. The adjustment unit 200 has a flapper 221 configured to switch the conveyance destination of the sheet P to the through path 230 and the measurement path 231.

In a case in which the front/back registration portion 700 does not perform the front/back registration, the flapper 221 waits in a downward state in which the conveyance destination of the sheet P is switched to the through path 230. The adjustment unit 200 receives the sheet P from the image forming apparatus 101 and conveys the sheet P to the through path 230 by a first conveyance roller 201. The sheet P is conveyed from the through path 230 to the discharge path 232 by a second conveyance roller 202 and a third conveyance roller 203. The sheet P is discharged to the post-processing apparatus 600 by a fourth conveyance roller 204.

In a case in which the front/back registration is performed by the front/back registration portion 700, the flapper 221 waits in an upward state in which the conveyance destination of the sheet P is switched to the measurement path 231. The adjustment unit 200 receives the sheet P from the image forming apparatus 101 and conveys the sheet P to the measurement path 231 by the first conveyance roller 201. The sheet P is conveyed to the front/back registration portion 700 by conveyance roller pairs 205, 206, 207, 208, 209 and 210. The front/back registration portion 700 reads the adjustment charts formed on both surfaces of the sheet P while conveying the sheet P by conveyance roller pairs 211, 212 and 213. The sheet P is conveyed to the discharge path 232 by a conveyance roller pair 214, and is discharged to the post-processing apparatus 600 by the fourth conveyance roller 204.

As shown in FIG. 2, the adjustment unit 200 includes the communication portion 250, an image processing portion 260, and a control portion 251. The communication portion 250 is electrically connected to the image processing portion 260 and the control portion 251. The communication portion 250 is electrically connected to the printer controller 103 of the image forming apparatus 101. The adjustment unit 200 further includes a conveyance motor 252, a conveyance path sensor 253, a flapper switching motor 240, a backing motor 834, a shading motor 810, a photo sensor 816, an image sensor 702, and an image sensor 703. The conveyance motor 252, the conveyance path sensor 253, the flapper switching motor 240, the backing motor 834, the shading motor 810, the photo sensor 816, the image sensor 702, and the image sensor 703 are electrically connected to the control portion 251. The image processing portion 260 is electrically connected to the image sensor 702 and the image sensor 703.

(Front/Back Registration Portion)

Figure 4:
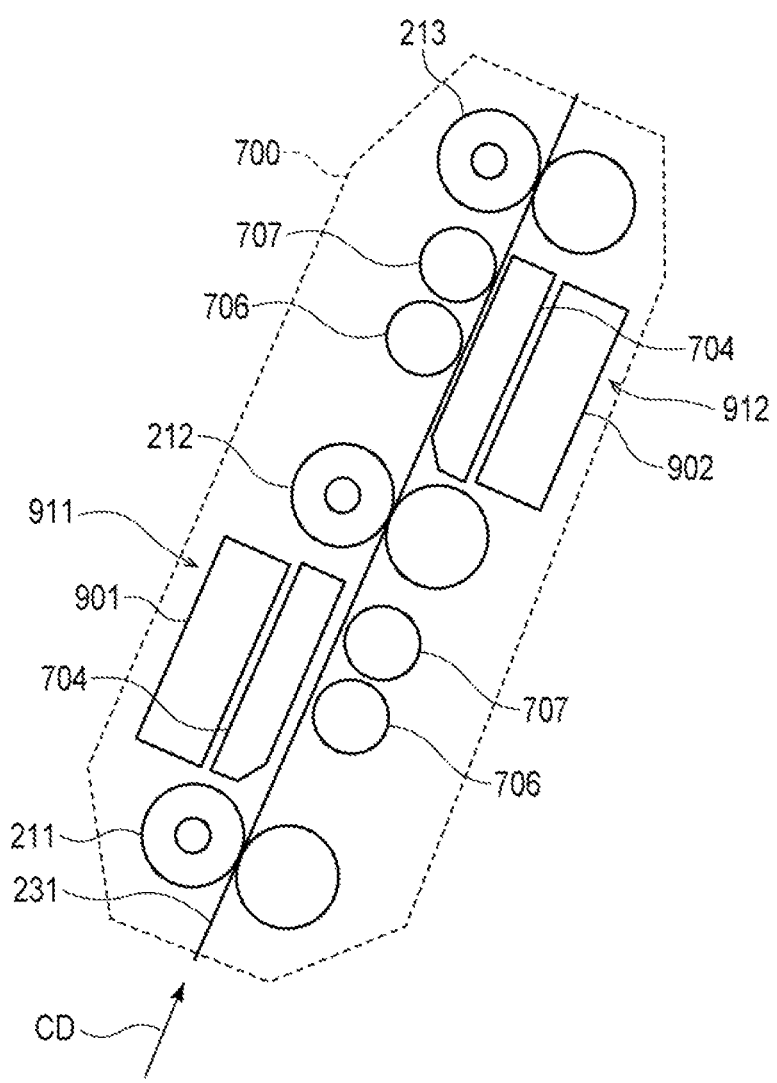
FIG. 4 is a view of a front/back registration portion.

With reference to FIG. 4, the structure of the front/back registration portion 700 will be described. FIG. 4 is a view of the front/back registration portion 700. The front/back registration portion 700 measures the shape of the sheet P and the shape and positional relationship of the image patterns formed on the sheet P. In order to obtain a highly accurate measurement result, it is necessary to average shape variations and printing position variations for respective sheets P, so that a plurality of sheets P are measured. In order to shorten the adjustment time for measuring the plurality of sheets P, the front/back registration portion 700 performs measurement while conveying the sheets P. Since it is desirable that the size of the front/back registration portion 700 is small, the front/back registration portion 700 uses contact image sensors (hereinafter referred to as CIS) 702 and 703 (FIG. 5) as the image sensors.

The front/back registration portion 700 includes a front side reading unit 911 configured to read the front side (first surface) of the sheet P, and a back side reading unit 912 configured to read the back side (second surface) of the sheet P. The front/back registration portion 700 read the adjustment charts formed on the front and back sides of the sheet P almost simultaneously. The front side reading unit 911 and the back side reading unit 912 are disposed on opposite sides with respect to the measurement path 231. The front side reading unit 911 includes a front side reading box 901, a reading glass (glass plate) 704 as a transparent member (light transmitting member), and a plurality of backing rollers 706 (first roller) and 707 (second roller). The back side reading unit 912 includes a back side reading box 902, a reading glass 704, and backing rollers 706 (a third roller) and 707 (a fourth roller). The reading glass 704 forms a part of the measurement path 231. The front side reading box 901 is disposed on one side of the measurement path 231. The back side reading box 902 is disposed on the other side of the measurement path 231. The front side reading box 901 and the back side reading box 902 continuously read the front and back sides of the sheet P conveyed in the conveyance direction CD. Each of the front side reading box 901 and the back side reading box 902 is provided with a plurality of CISs 702 and 703 as reading units. Each of the front side reading box 901 and the back side reading box 902 is disposed opposite to the measurement path 231 through the reading glass 704. The backing rollers 706 and 707 are disposed on the opposite side of the measurement path 231 opposite to the reading glass 704.

The conveyance roller pairs (conveyance portions) 211, 212 and 213 convey the sheet P in the conveyance direction CD at a stable conveyance speed. The conveyance roller pairs 211, 212 and 213 are driven by the conveyance motor (drive unit) 252. The reading glass 704 functions as a guide member configured to guide the movement of the sheet P to stabilize the position of the sheet P in the depth of focus direction of the CISs 702 and 703 of the front side reading box 901 and the CISs 702 and 703 of the back side reading box 902. The backing rollers 706 and 707 are black in order to clarify the contrast between the surfaces of the backing rollers 706 and 707 and the end of the sheet P. The backing rollers 706 and 707 are driven by the backing motor 834.

(Reading Unit)

Figure 5:
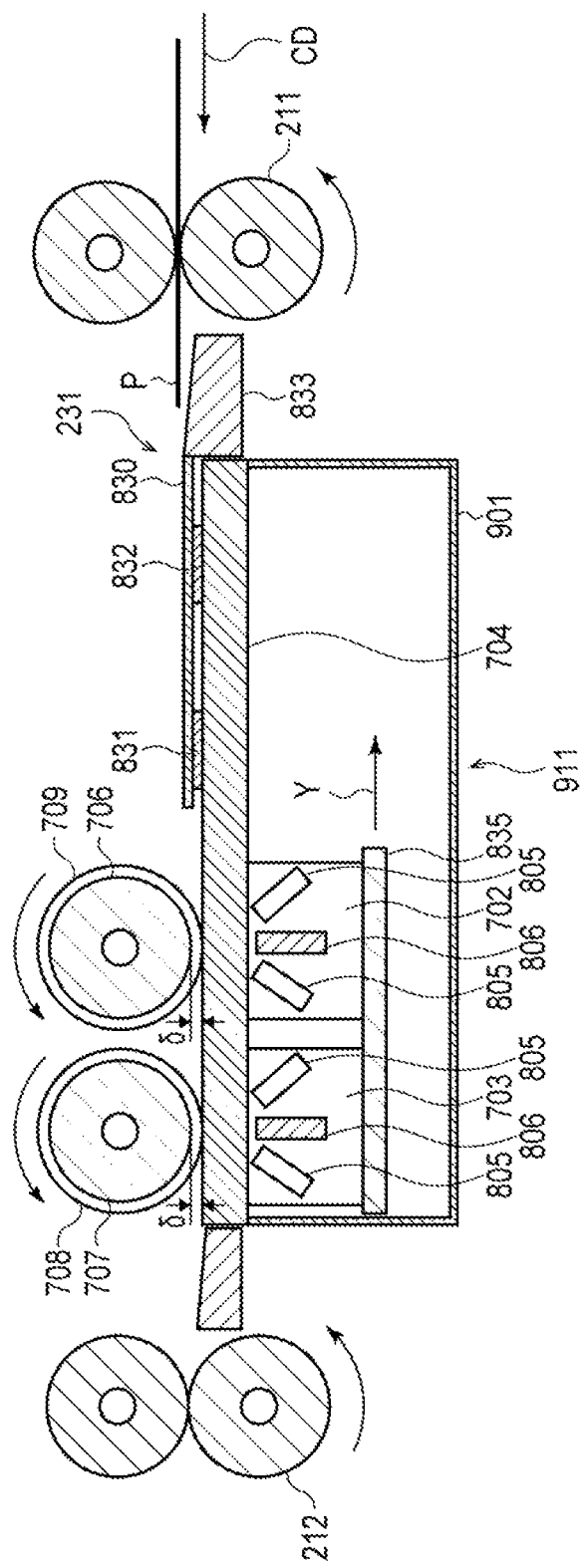
FIG. 5 is a cross-sectional view of a front side reading unit.
Figure 6:
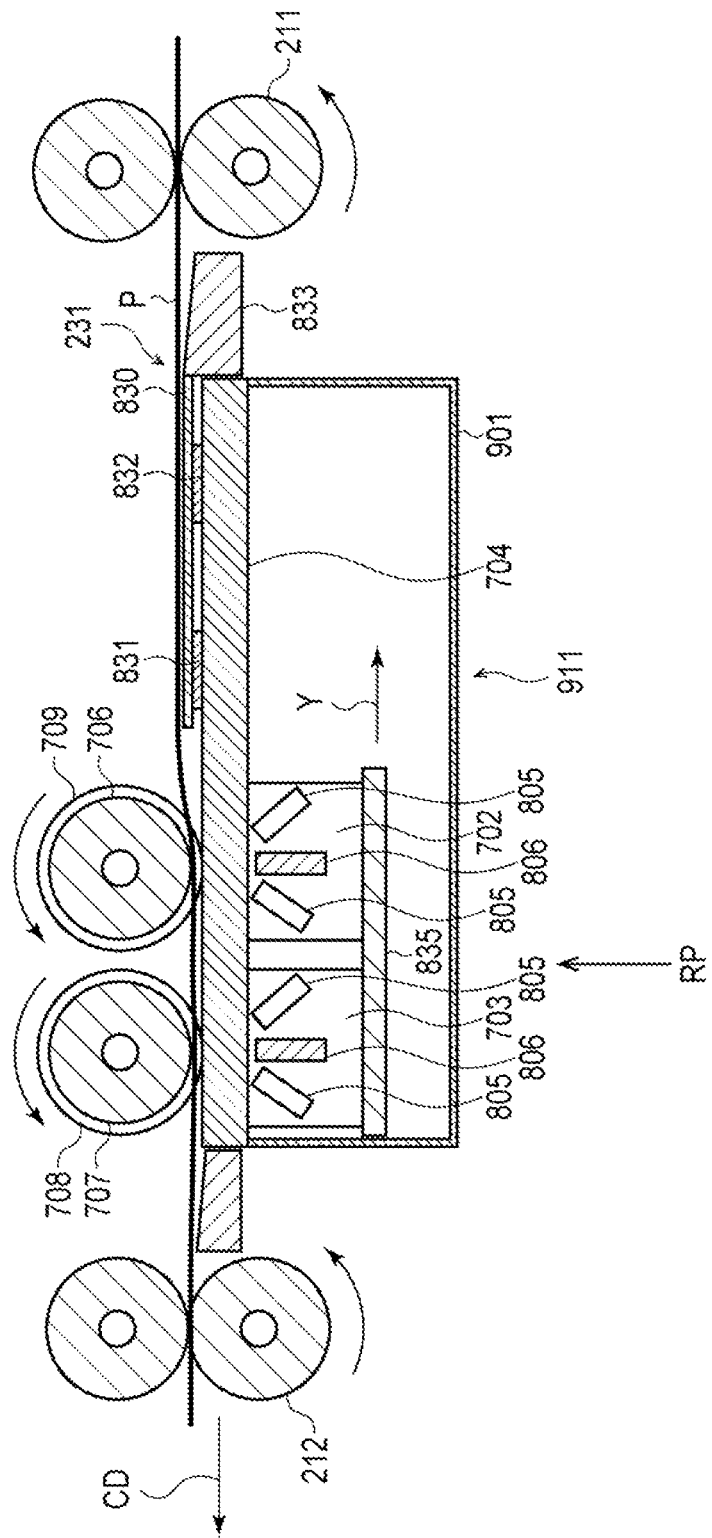
FIG. 6 is a cross-sectional view of the front side reading unit.

The front side reading unit 911 and the back side reading unit 912 have substantially similar structures except that their orientations relative to the measurement path 231 are reversed. Therefore, the front side reading unit 911 will be described below, and the description of the back side reading unit 912 will be omitted. FIGS. 5 and 6 are cross-sectional views of the front side reading unit 911. A state in which the sheet P is conveyed to the front side reading unit 911 will be described with reference to FIGS. 5 and 6.

The CIS 702 is disposed opposite to the backing roller 706 through the reading glass 704. The CIS 703 is disposed opposite to the backing roller 707 through the reading glass 704. CISs 702 and 703 are carried by a carriage 835. The CISs 702 and 703 are movable in the sub-scanning direction Y along the conveyance direction CD by the carriage 835.

The sheet P is conveyed to an upper surface of the transparent reading glass 704 in the conveyance direction CD by the conveyance roller pair 211. A plurality of white reference plates (a plurality of reference members) 831 and 832 are disposed on a surface (first surface) of the reading glass 704 on the side of the measurement path (conveyance path) 231. A sheet guide member 830 is arranged on white reference plates 831 and 832. The sheet P is conveyed on the sheet guide member 830, passes through a gap between the CIS 702 and the backing roller 706 and a gap between the CIS 703 and the backing roller 707, and is conveyed by a pair of downstream conveyance rollers 212 as shown in FIG. 6.

The CISs 702 and 703 each irradiates the sheet P with light by light emitting portions 805 having light sources, respectively, and converges the reflected light from the sheet P to a line-shaped light receiving portion (light receiving sensor surface) 806 by a rod lens array or the like. The reflected light received by each of the CISs 702 and 703 is photoelectrically converted and outputted to the image processing portion 260 as an output signal. The image processing portion 260 generates image data based on output signals of the CISs 702 and 703. The CISs 702 and 703 positioned at a reading position RP read the image of the sheet P conveyed at a constant speed on the reading glass 704 by a sheet flow reading method. The image processing portion 260 generates a front side measurement pattern image 822 for the sheet P, which will be described later, based on the output signals from the CISs 702 and 703.

The backing rollers 706 and 707 are driven by the backing motor 834 so as to rotate in the direction of the arrows in FIGS. 5 and 6 at a peripheral speed approximately equal to the conveyance speed (reading speed) of the sheet P. In the backing rollers 706 and 707, a gap δ between the backing rollers 706 and 707 and the reading glass 704 is set so as to reduce uncontrolled motion (fluctuation) of the sheet P conveyed to the reading position RP of the CISs 702 and 703. On both end portions in the axial direction of the backing rollers 706 and 707, abutment rollers (gap ensuring members) 708 (first abutment portions) and 709 (second abutment portions) are arranged as abutment portions abutting on the reading glass 704 and guaranteeing the gap δ between the backing rollers 706 and 707 and the reading glass 704. The gap δ between the backing rollers 706 and 707 and the reading glass 704 is obtained by adding a margin (margin gap) to the thickness of the conveyed sheet P. The gap δ is set so that the front side (reading surface) of the sheet P falls within the readable range of the CISs 702 and 703 even if the sheet P flutters.

(Shading Correction)

Figure 7:
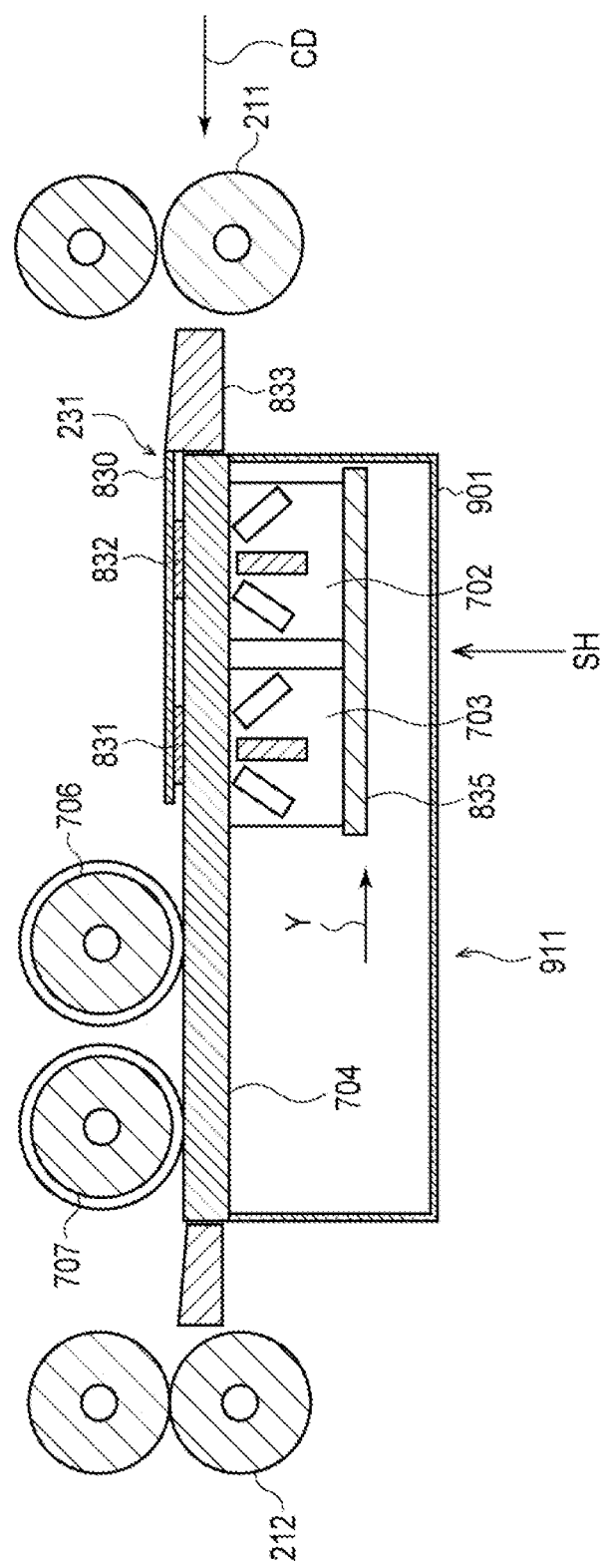
FIG. 7 is a cross-sectional view of the front side reading unit with CISs moved to a shading correction position.
Figure 8:
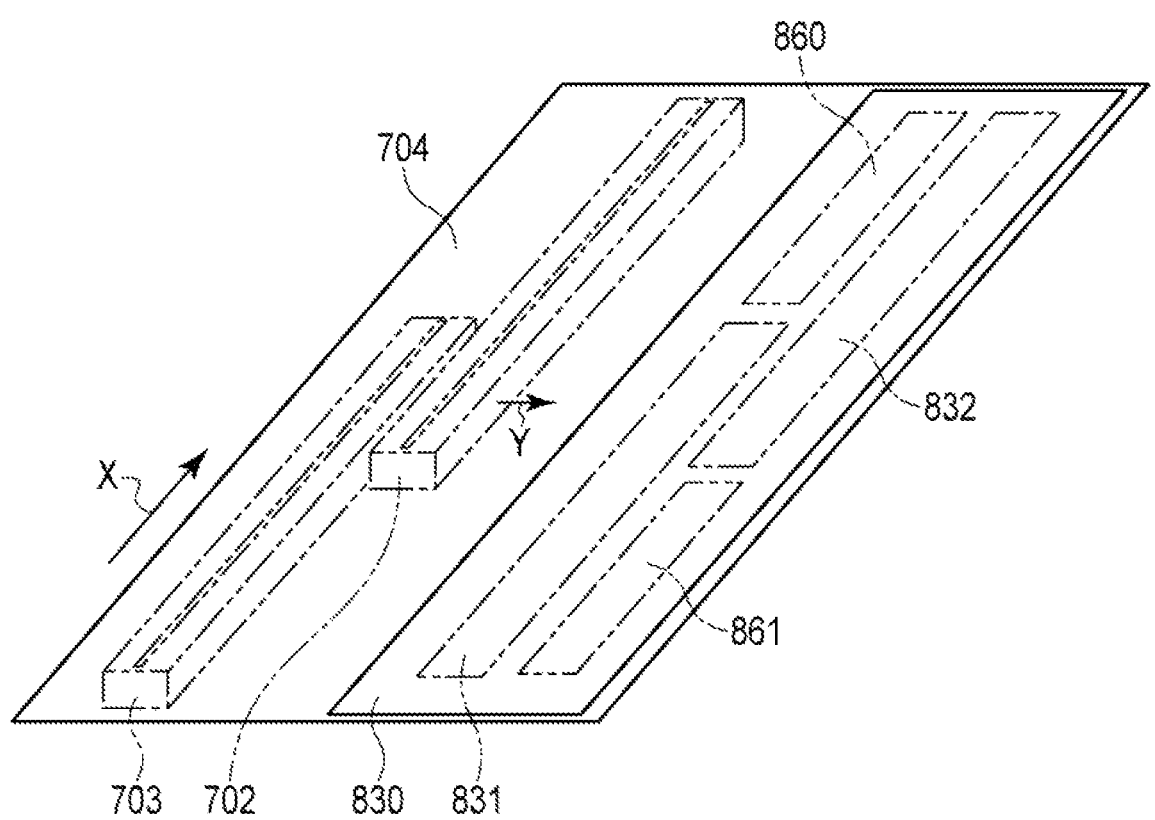
FIG. 8 is a perspective view of the CISs as viewed from a side of a reading glass.

Shading correction will be described with reference to FIGS. 7 and 8. FIG. 7 is a cross-sectional view of the front side reading unit 911 with the CISs 702 and 703 moved to a shading correction position SH. FIG. 8 is a perspective view of the CISs 702 and 703 as viewed from the side of the reading glass 704. In order to perform the shading correction, the CISs 702 and 703 are moved in the sub-scanning direction Y from the reading position RP (FIG. 6) on the downstream side to the shading correction position SH (FIG. 7) on the upstream side in the conveyance direction CD of the sheet P by the carriage 835.

The CISs 702 and 703 cannot perform uniform image reading due to unevenness in the light quantity of the light emitting portion 805 and unevenness in the sensitivity of the light receiving portion 806. Therefore, the shading correction is performed to enable uniform image reading. In the shading correction, the CISs 702 and 703 read the white reference plates 831 and 832 from a surface (second surface) of the reading glass 704 on the side opposite to the surface (first surface) on the side of the measuring path (conveyance path) 231. The reading surfaces of the white reference plates 831 and 832 are totally controlled in color. The CISs 702 and 703 each outputs an output signal (image data) as a reading result to the image processing portion 260. The image processing portion 260 generates a correction value for correcting image data when reading a sheet P based on output signals of CISs 702 and 703 when reading white reference plates 831 and 832. The control portion 251 corrects a light emission amount of the light emitting portions 805 irradiating the sheet P based on the correction value and corrects an amplification factor (gain) for amplifying the output signal of the light receiving portion 806 when the sheet P is read based on the correction value. In this way, the CISs 702 and 703 can read the sheet P uniformly by adjusting the amount of light emitted from the light emitting portions 805 and/or the amplification factor (gain) of the light receiving portion 806 based on the reading results of the white reference plates 831 and 832.

In the embodiment, the shading correction position SH (FIG. 7) is disposed on the upstream side of the reading position RP (FIG. 6) in the conveyance direction CD of the sheet P. Accordingly, the white reference plates 831 and 832 are disposed upstream of the reading position RP in the conveyance direction CD of the sheet P. The white reference plates 831 and 832 should be as level as possible as the sheet P conveyed through the measurement path 231 in the depth of focus direction of the CISs 702 and 703 to improve the accuracy of the shading correction. Therefore, in the embodiment, the white reference plates 831 and 832 are disposed on the surface (upper surface) of the reading glass 704 on the side of the measurement path 231.

In a case in which the white reference plates 831 and 832 are arranged on the upper surface of the reading glass 704 downstream of the reading position RP (FIG. 6) in the conveyance direction CD of the sheet P, the leading edge of the sheet P passing through the reading position RP is caught by the white reference plates 831 and 832 and jammed. In a case in which the white reference plates 831 and 832 are arranged on the lower surface (back surface) of the reading glass 704 in order to prevent the occurrence of jamming, the accuracy of the shading correction is reduced. This is because the accuracy of the shading correction becomes higher by arranging the white reference plates 831 and 832 at the same level as the sheet, to be flowed, in the depth of focus direction of the CIS 702 and 703. Therefore, in the present embodiment, as described above, the white reference plates 831 and 832 are disposed on the surface (upper surface) of the reading glass 704 on the side of the measurement path 231 at the upstream side of the reading position RP (FIG. 6) in the conveyance direction CD of the sheet P.

The white reference plates 831 and 832 may be formed on the surface (upper surface) of the reading glass 704 on the side of the measurement path 231 by printing or painting. Alternatively, the white reference plates 831 and 832 may be affixed to the surface (upper surface) of the reading glass 704 on the side of the measurement path 231 by an adhesive or double-sided tape. The white reference plates 831 and 832 are provided so that the reference white surface, which is entirely color controlled, is on the surface side of the reading glass 704. The white reference plates 831 and 832 are expensive, and are handled so that no scratches, dust, or the like adhere thereto.

As shown in FIG. 8, the CISs 702 and 703 are arranged (staggered) to be shifted from each other in the main scanning direction X (width direction) and the sub-scanning direction Y (conveyance direction CD). The CISs 702 and 703 are arranged so that parts of the CISs 702 and 703 overlap with each other in the conveyance direction. By displacing the two CISs 702 and 703 in the main scanning direction X so as to partly overlap with each other, a read area wider than a read area which can be read by one CIS 702 can be read.

In the embodiment, by displacing the two CISs 702 and 703 in the main scanning direction X so as to partly overlap with each other, the read area wider than the width of the sheet P in the main scanning direction X can be read. The CISs 702 and 703 can detect the edge of the sheet P by reading the black area of the backing rollers 706 and 707 as the background together with the image of the sheet P, thereby increasing the contrast between the edge of the sheet P and the black area. This improves the accuracy of the front/back registrations.

Similarly to the CISs 702 and the CIS 703, the white reference plates 831 and 832 are arranged (staggered) so as to be shifted from each other in the main scanning direction X and the sub-scanning direction Y as shown in FIG. 8. Thus, the area of the white reference plates 831 and 832 is reduced so that the cost can be reduced. Further, the sheet guide member (guide sheet) 830 is disposed so as to cover the white reference plates 831 and 832. The sheet guide member 830 is bonded to the white reference plates 831 and 832 so as to cover the entire surfaces of the white reference plates 831 and 832 so that the leading edge of the conveyed sheet P is not caught by the white reference plates 831 and 832. Since the white reference plates 831 and 832 arranged in the staggered shape are arranged on the upper surface of the reading glass 704 on the upstream side of the conveyance direction CD and covered with the sheet guide member 830, the sheet conveying performance is improved without staining the white reference plates 831 and 832.

The sheet guide member 830 may be adhered to the reading glass 704 so as to smoothly continue to a conveyance guide member 833 forming a part of the measurement path 231 between the conveyance roller pair 211 disposed upstream of the reading glass 704 and the reading glass 704. A smoothness of the surface of the sheet guide member 830 is improved by providing underlay sheets 860 and 861 in a region where the white reference plates 831 and 832 are not provided so that wrinkles or bumps do not appear on the surface of the sheet guide member 830. Since the sheet guide member 830 is rubbed by the conveyed sheet P, the sheet guide member 830 is formed of a conductive member, for example, a stainless sheet, and is grounded in order to suppress frictional static electricity. By making the sheet guide member 830 conductive, dirt and paper dust of the sheet P can be reduced from adhering to the sheet guide member 830.

(Shading Drive Portion)

Figure 9:
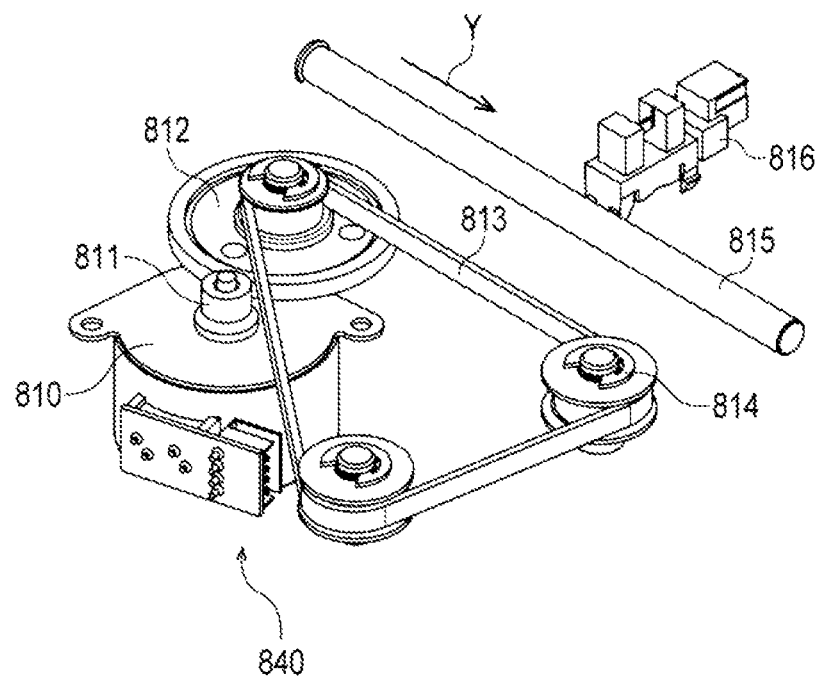
FIG. 9 is a perspective view of a shading drive portion.
Figure 10:
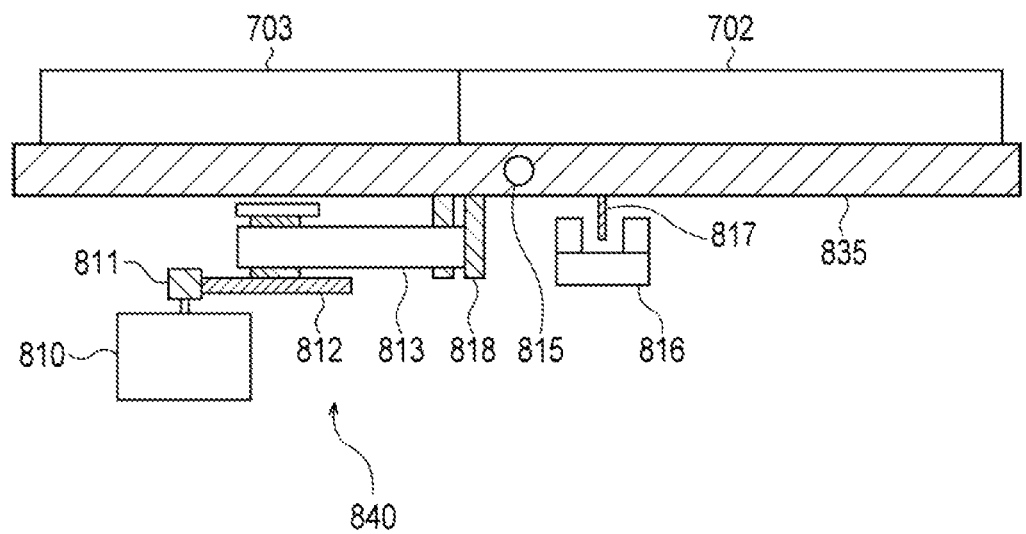
FIG. 10 is a side view of the shading drive portion.

A shading drive portion 840 will be described with reference to FIGS. 9 and 10. FIG. 9 is a perspective view of the shading drive portion 840. FIG. 10 is a side view of the shading drive portion 840. The shading drive portion 840 has the shading motor 810, a motor gear 811, a gear pulley 812, a timing belt 813, an idler pulley 814 and a slide guide shaft 815. The shading drive portion 840 further includes the photo sensor 816, a sensor flag 817, a belt holding portion 818, and the carriage 835.

The carriage 835 holds CISs 702 and 703. The slide guide shaft 815 extends in the sub-scanning direction Y parallel to the conveyance direction CD of the sheet P. The slide guide shaft 815 slidably supports the carriage 835 in the sub-scanning direction Y. The carriage 835 is provided with the belt holding portion 818. The belt holding portion 818 holds a part of the timing belt 813 and is fixed to the timing belt 813. The timing belt 813 is looped around the pulley of the gear pulley 812 and the idler pulley 814. The idler pulley 814 tensions the timing belt 813. A gear of the gear pulley 812 meshes with the motor gear 811 of the shading motor 810 as a driving source. The driving force of the shading motor 810 is transmitted to the timing belt 813 through the motor gear 811 and the gear pulley 812.

By rotating the shading motor 810, the carriage 835 is moved in the sub-scanning direction Y via the timing belt

813. The carriage 835 is provided with the sensor flag 817. The photo sensor 816 detects transmission and light shielding of light by the sensor flag 817 accompanying movement of the carriage 835. The home position and the stop position of the carriage 835 are controlled based on a detection timing of the sensor flag 817 by the photo sensor 816. By controlling the shading motor 810 based on a detection result of the photo sensor 816, the CISs 702 and 703 can be reciprocally driven between the reading position RP and the shading correction position SH.

(Configuration of Backing Roller Unit)

Figure 11:
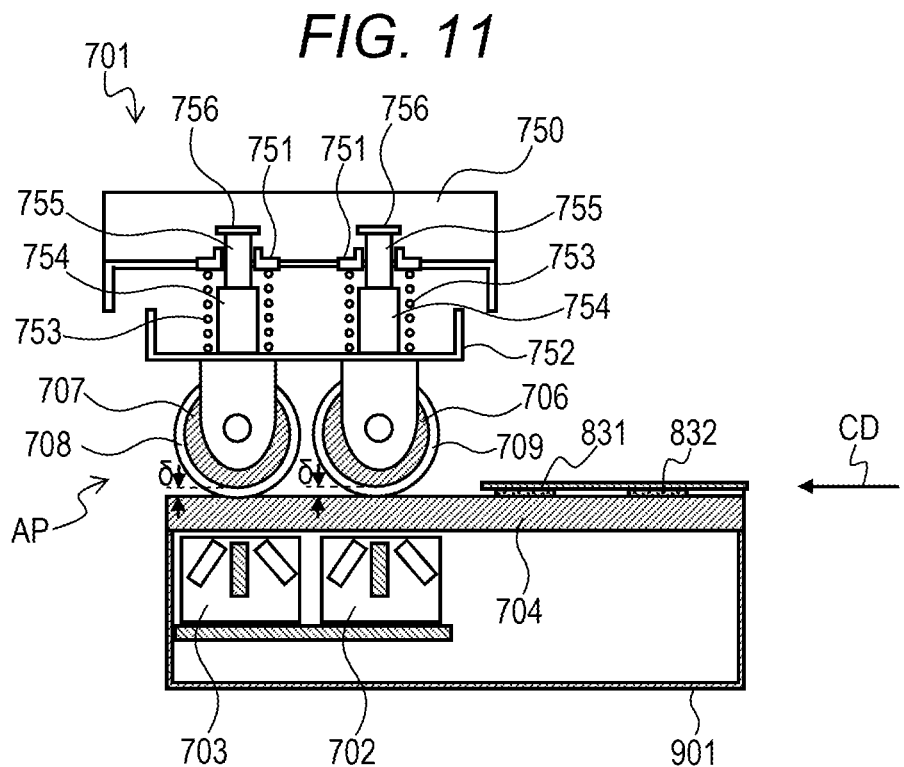
FIG. 11 is a cross-sectional view of a backing roller unit in contact with the reading glass.
Figure 12:
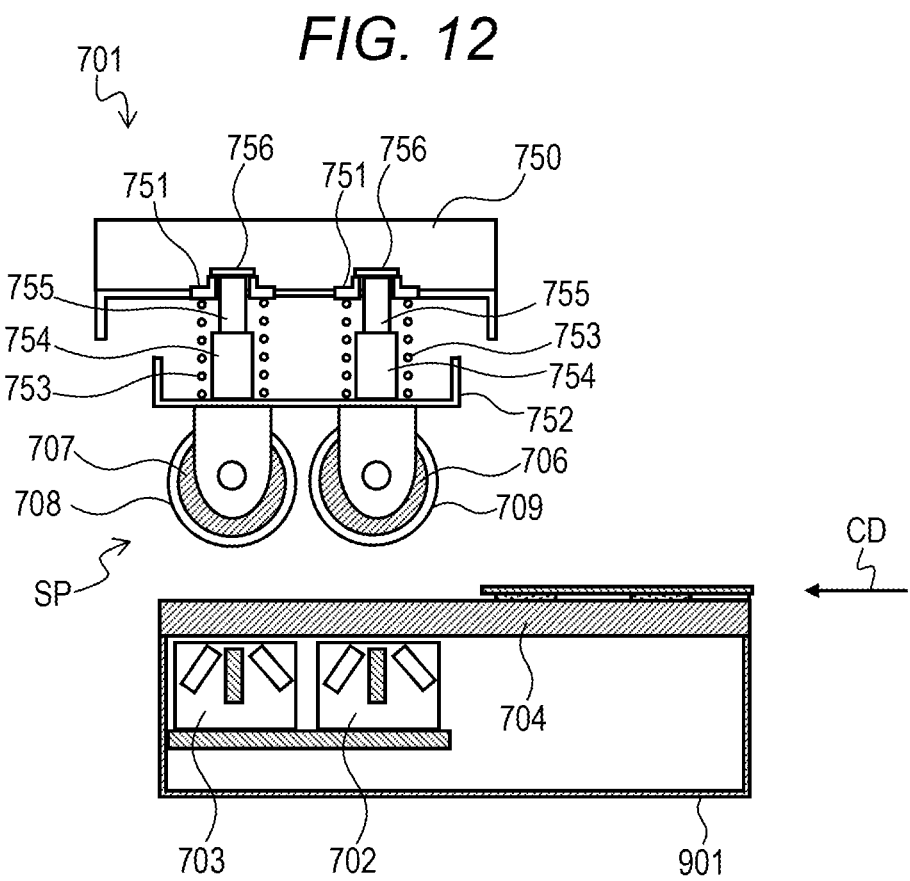
FIG. 12 is a cross-sectional view of the backing roller unit spaced from the reading glass.
Figure 13:
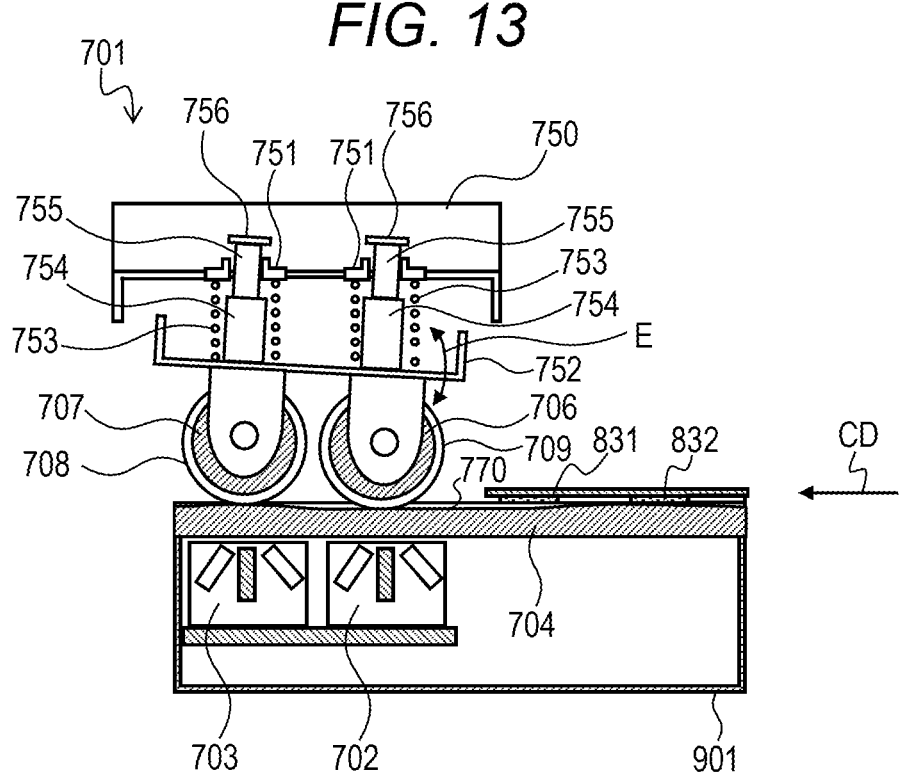
FIG. 13 is a cross-sectional view of the backing roller unit following a recessed portion of the reading glass.
Figure 14:
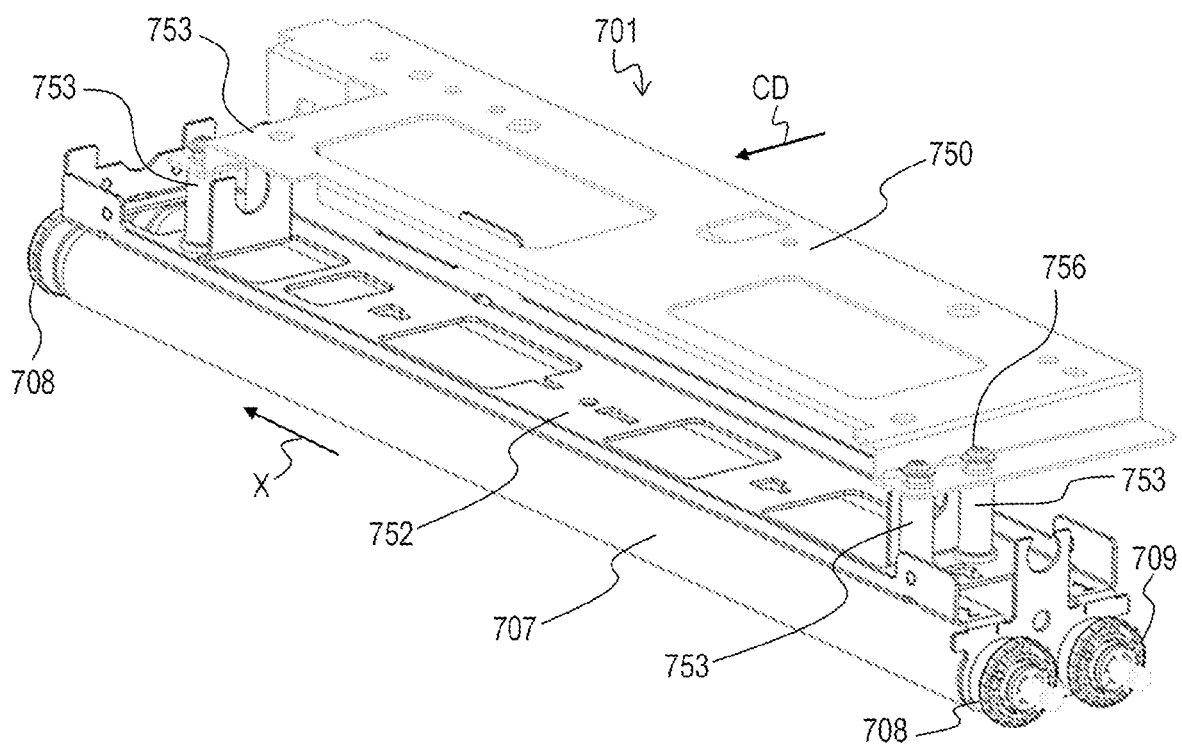
FIG. 14 is a perspective view of the backing roller unit.

Referring to FIGS. 11 to 14, a backing roller unit 701 arranged opposite to the front side reading box 901 will be described. FIG. 11 is a cross-sectional view of the backing roller unit 701 in contact with the reading glass 704. FIG. 12 is a cross-sectional view of the backing roller unit 701 spaced from the reading glass 704. FIG. 13 is a cross-sectional view of the backing roller unit 701 following a recessed portion 770 of the reading glass 704. FIG. 14 is a perspective view of the backing roller unit 701.

As shown in FIG. 11, the plurality of backing rollers 706 and 707 are disposed opposite to the plurality of CISs 702 and 703, respectively. The abutment roller 709 having a radius larger than that of the backing roller 706 by a gap amount between the backing roller 706 and the reading glass 704 is arranged at both ends of the backing roller 706. When the abutment roller 709 abuts on the reading glass 704, the gap δ between the backing roller 706 and the reading glass 704 is secured to a predetermined amount (predetermined distance). The abutment roller 708 having a radius larger than that of the backing roller 707 by a gap amount between the backing roller 707 and the reading glass 704 is arranged at both ends of the backing roller 707. When the abutment roller 708 abuts on the reading glass 704, the gap δ between the backing roller 707 and the reading glass 704 is secured to a predetermined amount.

The backing roller unit 701 has a holding frame (holding member) 752. The backing rollers 706 and 707 and the abutment rollers 708 and 709 are supported by one holding frame 752. By integrally holding the backing rollers 706 and 707 and the abutment rollers 708 and 709 by one holding frame 752, the positional accuracy of the backing rollers 706 and 707 in the conveyance direction CD is better guaranteed. The backing rollers 706 and 707 are disposed directly above the CISs 702 and 703, respectively, and are close to each other. Thus, with the simple configuration, the fluttering of the sheet P conveyed on the CISs 702 and 703 is suppressed.

Four stepped shafts (shaft members) 754 are projected from the holding frame 752. The stepped shaft 754 is provided so as to project from the holding frame 752 to a side opposite to a side of the holding frame 752 on which the holding frame 752 holds the backing rollers 706 and 707. Two stepped shafts 754 are provided at one end in the longitudinal direction (main scanning direction X) of the holding frame 752. Another two stepped shafts 754 are provided at the other end in the longitudinal direction of the holding frame 752. The stepped shaft 754 has a small diameter portion 755 on the side of a distal end portion. The small diameter portion 755 is inserted into a hole of a bearing 751 provided in a frame 750 of the backing roller unit 701. The bearing 751 is fixed to the frame 750. A stopper flange 756 serving as a removal-preventive member (a stopper) is provided at a distal end portion of the small diameter portion 755. The stepped shaft 754 is inserted into a compression spring (urging portion) 753 serving as an elastic member. One end of the compression spring 753 is in contact with the holding frame 752. The other end of the compression spring 753 is in contact with the bearing 751 of the frame 750. The compression spring 753 urges the holding frame 752 in a direction away from the frame 750. The stopper flange 756 regulates a movement of the stepped shaft 754 so that the stepped shaft 754 does not come off from the bearing 751 by the urging force of the compression spring 753. The frame 750 holds the holding frame 752 via the stepped shaft 754.

The frame 750 of the backing roller unit 701 is rotatably held by a hinge mechanism (not shown) in a housing (main body) 270 (FIG. 3) of the adjustment unit 200. By means of a hinge mechanism (not shown), the backing roller unit 701 is movable to an abutting position AP (FIG. 11) where the abutment rollers 708 and 709 abut on the reading glass 704 and a separating position SP (FIG. 12) where the abutment rollers 708 and 709 are separated from the reading glass 704.

As shown in FIG. 11, when the backing roller unit 701 is in the abutting position AP, the abutment rollers 708 and 709 are urged against the reading glass 704 by the urging force of the compression spring 753. The holding frame 752 is a structure configured to axially support the abutment rollers 708 and 709, and is formed to be elastically deformable by the urging force of the compression spring 753. Due to the elastic deformation of the holding frame 752, the abutment rollers 708 and 709 abut against the surface of the reading glass 704 and can follow the shape of the surface of the reading glass 704. Since the two backing rollers 706 and 707 are provided with the abutment rollers 708 and 709 at both ends, a total of four (4) abutment portions are abutted against the surface of the reading glass 704. The small diameter portion 755 of the stepped shaft 754 provided on the holding frame 752 is held slidably in the axial direction of the stepped shaft 754 by the bearing 751 provided on the frame 750. By elastic deformation of the holding frame 752 and sliding movement of the small diameter portion 755 with respect to the bearing 751, four (4) points of the abutment rollers 708 and 709 can surely land on the surface of the reading glass 704.

The backing roller unit 701 is openable and closable with respect to the front side reading box 901 by the hinge mechanism (not shown). In a case in which the sheet P is jammed at the reading position on the CISs 702 and 703 or in a case in which the reading glass 704 is cleaned, as shown in FIG. 12, the backing roller unit 701 is released from the reading glass 704 to secure a space for jam clearance or cleaning treatment. When the backing roller unit 701 is released from the front side reading box 901, the stopper flange 756 abuts on the bearing 751 to restrict the holding frame 752 from projecting from the frame 750. The backing rollers 706 and 707 are prevented from dropping from the backing roller unit 701 by the stopper flange 756.

The surface of the reading glass 704 shown in FIGS. 11 and 12 is planar. However, the surface of the reading glass 704 may not be planar. In a case in which the plurality of the CISs 702 and 703 and the plurality of the white reference plates 831 and 832 are arranged in the width direction (conveyance direction CD) of the reading glass 704 as in the embodiment, it is necessary to secure a moving space for the CISs 702 and 703 for the shading correction. Therefore, since the length of the reading glass 704 in the width direction is long, the reading glass 704 may be deformed by its own weight or by a method of holding the reading glass 704, resulting in that the recessed portion 770 of about several 10 μm is formed in the reading glass 704. According to the backing roller unit 701 in the embodiment, as shown in FIG. 13, the abutment roller 709 can abut on the surface of the recessed portion 770. The holding frame 752 is elastically deformed in the direction indicated by the arrow E in FIG. 13, and the small diameter portion 755 of the stepped shaft 754 slides with respect to the bearing 751, so that the abutment roller 709 is surely abutted on the recessed portion 770 of the reading glass 704. Thus, the gap δ between the backing roller 706 and the reading glass 704 is secured to the predetermined amount. Since the gap δ is secured to the predetermined amount, even if the sheet P conveyed between the backing roller 706 and the reading glass 704 flutters, the sheet P is maintained within the readable range of the CISs 702 and 703. Thus, the images read by the CISs 702 and 703 are not disturbed.

(Feedback Structure of Front/Back Registration)

The measurement by the front/back registration portion 700 and the feedback destination of the measurement result will be described. FIG. 15 is a view showing a sheet library 900. As shown in FIG. 15, a first geometric adjustment value 921 for the front side and a second geometric adjustment value 922 for the back side are set in accordance with a sheet type 910. FIG. 16 is a view showing a sheet library editing screen 1001 displayed on the operation portion 180. A user can select and set the sheet type 910 from the sheet library editing screen 1001. When the image forming apparatus 101 receives a request from a print position adjustment button 1002 in the sheet library editing screen 1001 shown in FIG. 16 by an operation of the operation portion 180 by the user, it forms a patch image 820 (FIGS. 17A and 17B) as an adjustment chart on the sheet P.

Figure 17A:
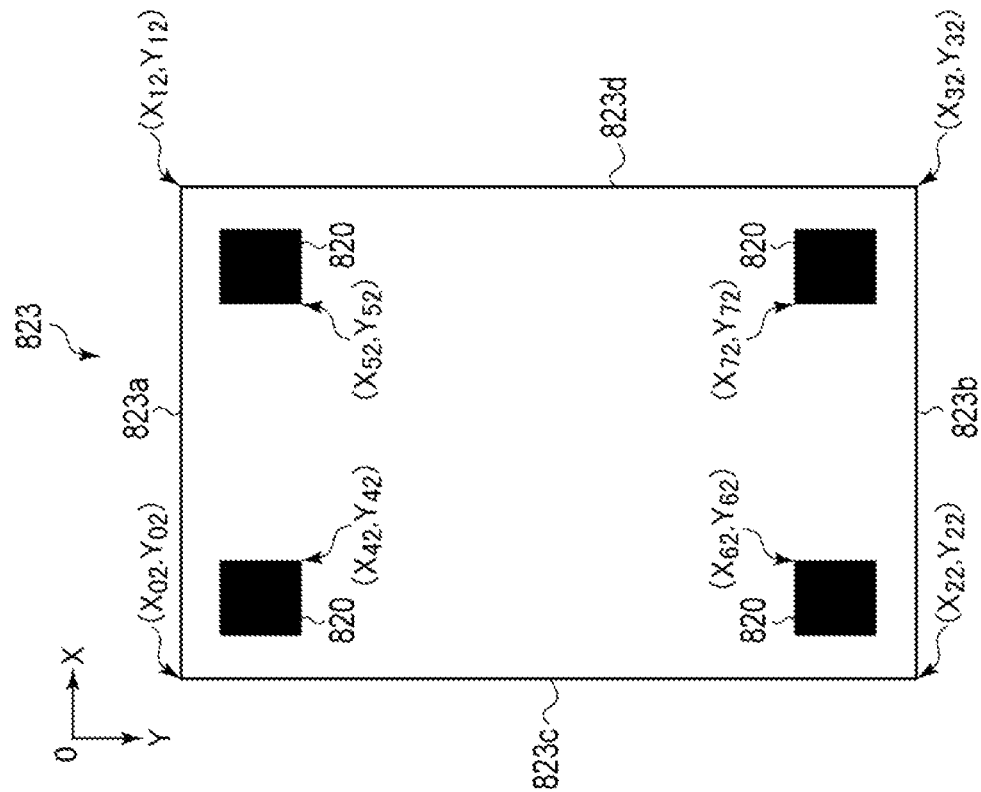
FIG. 17A is a view showing a patch image formed on a front side of a sheet.
Figure 17B:
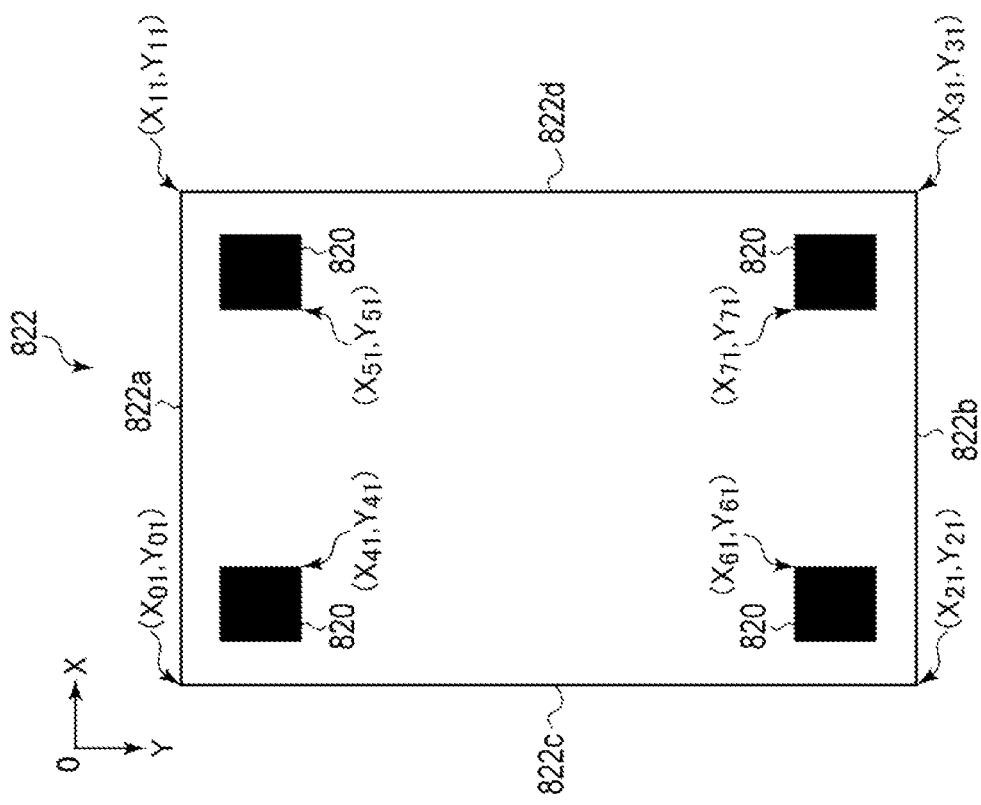
FIG. 17B is a view showing the patch image formed on a back side of the sheet.

FIGS. 17A and 17B are views showing the patch images 820 formed on the sheet P. While the sheet P is conveyed by the conveyance roller pairs 211, 212 and 213, the front/back registration portion 700 reads the front side of the sheet P, on which the patch image 820 as the adjustment chart is formed, by the CISs 702 and 703 of the front side reading box 901. The front side of the sheet P is continuously read by the CISs 702 and 703, read line images are joined to composite image data, and measurement is performed from the composite image. Similarly, the CISs 702 and 703 of the back side reading box 902 read the back side of the sheet P conveyed by the conveyance roller pairs 211, 212 and 213.

FIG. 17A shows the front side measurement pattern image 822 in which the front side of the sheet P on which the patch images 820 are formed is read by the CISs 702 and 703 of the front side reading box 901. The four patch images 820 are formed in the four corner regions of the front side measurement pattern image 822. The front side measurement pattern image 822 includes a leading edge 822a and a trailing edge 822b in the conveyance direction CD of the sheet P, and a left edge 822c and a right edge 822d along the conveyance direction CD. The conveyance direction CD of the sheet P is a sub-scanning direction Y, and a direction orthogonal to the sub-scanning direction Y is a main scanning direction X.

The image processing portion 260 calculates sheet P detection coordinates $(X_{01}, Y_{01})$, $(X_{11}, Y_{11})$, $(X_{21}, Y_{21})$, and $(X_{31}, Y_{31})$ from the front side measurement pattern image 822.

The image processing portion 260 calculates detection coordinates $(X_{41}, Y_{41})$, $(X_{51}, Y_{51})$, $(X_{61}, Y_{61})$, and $(X_{71}, Y_{71})$ of the patch images 820 from the front side measurement pattern image 822. The image processing portion 260 measures a distortion amount of the image on the front side and a positional deviation amount between the sheet P and the image based on the detection coordinates $(X_{01}, Y_{01})$ to $(X_{71}, Y_{71})$. The image processing portion 260 calculates the first geometric adjustment value 921 (FIG. 15) that enables the shape correction instruction by the image shape correction portion 320, based on the distortion amount and the positional deviation amount of the image on the front side. The first geometric adjustment value 921 includes a lead position, a side position, a main scanning magnification, a sub scanning magnification, a right angle, and a rotation amount.

FIG. 17B shows a back side measurement pattern image 823 obtained by reading the back side of the sheet P, on which the patch images 820 are formed, by the CISs 702 and 703 of the back side reading box 902. The four patch images 820 are formed in four corner regions of the back side measurement pattern image 823. The back side measurement pattern image 823 includes a leading edge 823a and a trailing edge 823b in the conveyance direction CD of the sheet P, and a left edge 823c and a right edge 823d along the conveyance direction CD.

The image processing portion 260 calculates the detection coordinates $(X_{02}, Y_{02})$, $(X_{12}, Y_{12})$, $(X_{22}, Y_{22})$ and $(X_{32}, Y_{32})$ of the sheet P from the back side measurement pattern image 823. The image processing portion 260 calculates detection coordinates $(X_{42}, Y_{42})$, $(X_{52}, Y_{52})$, $(X_{62}, Y_{62})$ and $(X_{72}, Y_{72})$ of the patch images 820 from the back side measurement pattern image 823. The image processing portion 260 measures a distortion amount of the back image and a positional deviation amount between the sheet P and the image based on the detection coordinates $(X_{02}, Y_{02})$ to $(X_{72}, Y_{72})$. The image processing portion 260 calculates the second geometric adjustment value 922 (FIG. 15) that enables the shape correction instruction by the image shape correction portion 320, based on the distortion amount and the positional deviation amount of the image on the back side. The second geometric adjustment value 922 includes the lead position, the side position, the main scanning magnification, the sub scanning magnification, the right angle, and the rotation amount.

The first geometric adjustment value 921 and the second geometric adjustment value 922 calculated by the image processing portion 260 are transmitted to the sheet library 900 in the image forming apparatus 101 through the communication portion 250. The first geometric adjustment value 921 and the second geometric adjustment value 922 are stored in the sheet library 900 as a front side parameter and a back side parameter. In this way, the set values are stored in the sheet library 900 for each sheet type 910. By reading the set value from the sheet library 900 according to the sheet type 910 on which the print job is executed and by correcting the image position and the image distortion, the print image in which the front and back print positions are corrected can be outputted with high accuracy. Here, the front side measurement pattern image 822 and the back side measurement pattern image 823 exemplified in the present description may be measured before the execution of the print job or may be automatically measured at a predetermined timing as a calibration during the execution of the print job.

(Control Operation)

Figure 18:
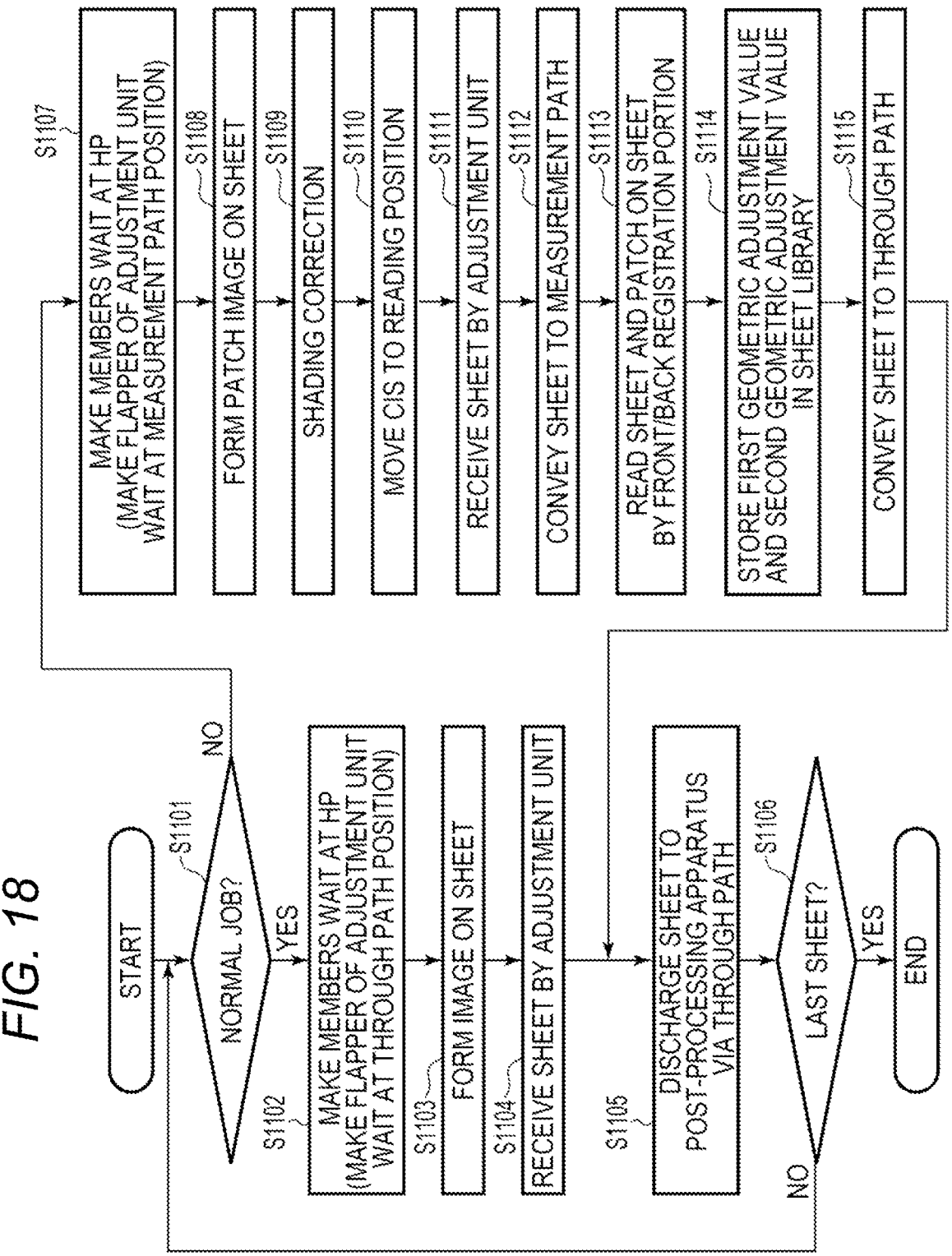
FIG. 18 is a flowchart of a control operation of conveying a sheet.

The control operation of conveying the sheet P in the image forming apparatus 101 and the adjustment unit 200 will be hereinafter described with reference to FIG. 18. FIG. 18 is a flowchart of a control operation of conveying the sheet P. The control portion 251 executes the control operation according to a program stored in an internal memory (not shown). When a user inputs a job from the operation portion 180, the control portion 251 starts the control operation. The control portion 251 determines whether or not the job is a normal print job (S1101). In a case in which the job is the normal print job (YES in S1101), the control portion 251 makes the associated members of the image forming apparatus 101 and the adjustment unit 200 wait at the home position (HP) (S1102). At this time, in order to guide the sheet P to the through path 230 in the adjustment unit 200, the control portion 251 makes the flapper 221 stand by downward (at a through path position) (S1102).

The image forming apparatus 101 forms an image on the sheet P (S1103). The adjustment unit 200 receives the sheet P on which the image is formed from the image forming apparatus 101 (S1104). The control portion 251 controls the conveyance motor 252 to discharge the sheet P to the post-processing apparatus 600 through the through path 230 and the discharge path 232 by the first conveyance roller 201, the second conveyance roller 202, the third conveyance roller 203, and the fourth conveyance roller 204 (S1105). The control portion 251 determines whether or not the sheet P is a last sheet (S1106). In a case in which the sheet P is not the last sheet (NO in S1106), the control portion 251 returns the process to S1101. In a case in which the sheet P is the last sheet (YES in S1106), the control portion 251 terminates the control operation.

On the other hand, when a user selects the sheet type 910 from the sheet library 900 by the operation portion 180 and selects the print position adjustment button 1002, a front/back registration job is inputted. In a case in which the job is the front/back registration job (NO in S1101), the control portion 251 makes the associated members of the image forming apparatus 101 and the adjustment unit 200 wait at the home position (HP) (S1107). At this time, in order to guide the sheet P to the measurement path 231 in the adjustment unit 200, the control portion 251 makes the flapper 221 stand by upward (at a measurement path position) (S1107).

The image forming apparatus 101 forms the patch images 820 as the adjustment charts on both surfaces of the sheet P (S1108). Before reading both surfaces of the sheet P, the control portion 251 moves the CISs 702 and 703 to the shading correction position SH and executes shading correction (S1109). The control portion 251 moves the CISs 702 and 703 to the reading position RP (S1110). The adjustment unit 200 receives the sheet P on which the patch images 820 are formed (S1111). The sheet P conveyed to the adjustment unit 200 is conveyed to the measurement path 231 by the flapper 221 (S1112). The sheet P is conveyed to the front/back registration portion 700 by the conveyance roller pairs 205, 206, 207, 208, 209 and 210.

The control portion 251 reads the sheet P and the patch images 820 formed on the both surfaces of the sheet P by the CISs 702 and 703 of the front side reading box 901 and the back side reading box 902, respectively (S1113). The image processing portion 260 obtains the front side measurement pattern image 822 and the back side measurement pattern image 823 from the reading results of the CISs 702 and 703. A high-definition line image composition is performed in the front/back registration portion 700, and print position deviation of the patch images 820 on the sheet P and the shape of the sheet P are measured. The image processing portion 260 calculates the first geometric adjustment value 921 and the second geometric adjustment value 922 from the front side measurement pattern image 822 and the back side measurement pattern image 823. The image processing portion 260 stores the first geometric adjustment value 921 and the second geometric adjustment value 922 in the sheet library 900 of the image forming apparatus 101 through the communication portion 250 (S1114). Thus, the print position adjustment for front/back registration is completed.

The sheet P having passed through the front/back registration portion 700 is conveyed to the through path 230 by the conveyance roller pair 214 (S1115). Thereafter, the sheet P is conveyed to the discharge path 232 by the third conveyance roller 203 and discharged to the post-processing apparatus 600 by the fourth conveyance roller 204 (S1105). The control portion 251 determines whether or not the sheet P is the last sheet (S1106), and in a case in which the sheet P is the last sheet (YES in S1106), the control portion 251 terminates the control operation.

According to the present embodiment, even in a case in which the flatness of the surface of the reading glass 704 is low, the gap $\delta$ between the reading glass 704 and the plurality of the backing rollers 706 and 707 can be guaranteed.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2021-010182, filed Jan. 26, 2021, which is hereby incorporated by reference herein in its entirety.

What is claimed is:

1. An image reading apparatus comprising:
   a conveyance path through which a sheet is conveyed in a conveyance direction;
   a light transmitting member arranged to form a part of the conveyance path;
   a first reading unit configured to read through the light transmitting member an image of a first surface of the sheet conveyed through the conveyance path in the conveyance direction;
   a second reading unit which is arranged at a position different from the first reading unit with respect to the conveyance direction and configured to read through the light transmitting member the image of the first surface of the sheet together with the first reading unit;
   a first roller disposed opposite to the first reading unit;
   a second roller disposed opposite to the second reading unit;
   a holding member configured to hold the first roller and the second roller;
   a plurality of first abutment portions provided on both end portion sides of the first roller with respect to a width direction orthogonal to the conveyance direction and configured to form a gap between the light transmitting member and the first roller by abutting on the light transmitting member;
   a plurality of second abutment portions provided on both end portion sides of the second roller with respect to the width direction and configured to form a gap between the light transmitting member and the second roller by abutting on the light transmitting member; and
   an urging member configured to urge the holding member against the light transmitting member.

2. The image reading apparatus according to claim 1, further comprising a frame configured to hold the holding member,
   wherein the urging member is arranged between the holding member and the frame.

3. The image reading apparatus according to claim 2, wherein the holding member is provided with shafts at both ends with respect to the width direction,
   wherein the shafts are inserted into holes provided in the frame.

4. The image reading apparatus according to claim 1, wherein the urging member is a compression spring.

5. The image reading apparatus according to claim 1, further comprising a plurality of reference members disposed on a surface of the light transmitting member on a side of the conveyance path,
wherein the plurality of reference members are arranged upstream of a reading position in which the first reading unit and the second reading unit read the sheet with respect to the conveyance direction.

6. The image reading apparatus according to claim 5, wherein the first reading unit and the second reading unit are movable to positions opposed to the first roller and the second roller and positions opposed to the plurality of reference members.

7. The image reading apparatus according to claim 5, wherein each of the plurality of reference members is a white reference plate.

8. The image reading apparatus according to claim 1, wherein a surface of the first roller and a surface of the second roller are black.

9. The image reading apparatus according to claim 1, wherein the holding member is elastically deformed by an urging force by the urging member.

10. The image reading apparatus according to claim 1, wherein the second reading unit is arranged at a position shifted from the first reading unit with respect to the width direction, and
wherein the first reading unit and the second reading unit are arranged so as to partly overlap each other as viewed along the conveyance direction.

11. The image reading apparatus according to claim 1, wherein the first roller and the second roller are movable to an abutting position where the first abutment portions and the second abutment portions abut on the light transmitting member and a separating position where the first abutment portions and the second abutment portions are separated from the light transmitting member.

12. The image reading apparatus according to claim 1, further comprising:
another light transmitting member other than the light transmitting member, the another light transmitting member being arranged to form a part of the conveyance path;
a third reading unit configured to read through the another light transmitting member an image of a second surface opposite to the first surface of the sheet conveyed through the conveyance path in the conveyance direction;
a fourth reading unit which is arranged at a position different from the third reading unit with respect to the conveyance direction and configured to read through the another light transmitting member the image of the second surface of the sheet together with the third reading unit;
a third roller disposed opposite to the third reading unit; and
a fourth roller disposed opposite to the fourth reading unit.

13. An image forming system comprising:
an image forming apparatus configured to form an image on a sheet; and
an image reading apparatus configured to read the image formed on the sheet by the image forming apparatus, the image reading apparatus comprising:
a conveyance path through which the sheet is conveyed in a conveyance direction;
a light transmitting member arranged to form a part of the conveyance path;
a first reading unit configured to read through the light transmitting member an image of a first surface of the sheet conveyed through the conveyance path in the conveyance direction;
a second reading unit which is arranged at a position different from the first reading unit with respect to the conveyance direction and configured to read through the light transmitting member the image of the first surface of the sheet together with the first reading unit;
a first roller disposed opposite to the first reading unit;
a second roller disposed opposite to the second reading unit;
a holding member configured to hold the first roller and the second roller;
a plurality of first abutment portions provided on both end portion sides of the first roller with respect to a width direction orthogonal to the conveyance direction and configured to form a gap between the light transmitting member and the first roller by abutting on the light transmitting member;
a plurality of second abutment portions provided on both end sides of the second roller with respect to the width direction and configured to form a gap between the light transmitting member and the second roller by abutting on the light transmitting member; and
an urging member configured to urge the holding member against the light transmitting member.

* * * * *